US012006767B2

(12) United States Patent
Beggs et al.

(10) Patent No.: US 12,006,767 B2
(45) Date of Patent: Jun. 11, 2024

(54) APPARATUS AND METHODS FOR DOOR CURTAIN BREAKAWAY DETECTION

(71) Applicant: Rite-Hite Holding Corporation, Milwaukee, WI (US)

(72) Inventors: Ryan P. Beggs, Dubuque, IA (US); Michael Sivill, Dubuque, IA (US); Christopher Saleh, Ames, IA (US); Charles Runde, Hazel Green, WI (US); James Pelegrin, Dubuque, IA (US); Nicholas J. Casey, Cascade, IA (US); Perry W. Knutson, Lancaster, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 18/329,718

(22) Filed: Jun. 6, 2023

(65) Prior Publication Data

US 2024/0084644 A1 Mar. 14, 2024

Related U.S. Application Data

(63) Continuation of application No. 17/016,019, filed on Sep. 9, 2020, now Pat. No. 11,708,722.
(Continued)

(51) Int. Cl.
*E06B 9/58* (2006.01)
*E06B 9/13* (2006.01)
*E06B 9/68* (2006.01)

(52) U.S. Cl.
CPC ................ *E06B 9/581* (2013.01); *E06B 9/13* (2013.01); *E06B 2009/585* (2013.01);
(Continued)

(58) Field of Classification Search
CPC ...... E06B 9/581; E06B 9/13; E06B 2009/585; E06B 2009/6827; E06B 2009/6836; E06B 2009/6845
See application file for complete search history.

(56) References Cited

U.S. PATENT DOCUMENTS 5,141,044 A 8/1992 Hying et al.
5,299,617 A 4/1994 Hying et al.
(Continued)

FOREIGN PATENT DOCUMENTS

EP 2441911 A1 4/2012
EP 2993297 A1 3/2016
WO 2009153501 A1 12/2009

OTHER PUBLICATIONS

Rite-Hite, "Fas Trax®• FasTrax® LD • FasTrax® FR • FasTrax® FR LD Installation/Owner's Manual," Feb. 17, 2017, 136 pages.
(Continued)

*Primary Examiner* — Johnnie A. Shablack
(74) *Attorney, Agent, or Firm* — Hanley, Flight & Zimmerman, LLC

(57) ABSTRACT

An example apparatus includes a sensor to detect a lateral edge of a door curtain within a guide of a door, and a controller to identify when the door curtain transitions from an operational state to a breakaway state based on a signal from the sensor, the operational state corresponding to when the lateral edge of the door curtain is enclosed by the guide as the door curtain moves between open and closed positions, and the breakaway state corresponding to when a portion of the lateral edge of the door curtain below an upper end of the guide breaks away from the guide.

20 Claims, 23 Drawing Sheets

Related U.S. Application Data

(60) Provisional application No. 62/897,790, filed on Sep. 9, 2019.

(52) U.S. Cl.
CPC ................. *E06B 2009/6827* (2013.01); *E06B 2009/6836* (2013.01); *E06B 2009/6845* (2013.01)

(56) References Cited

U.S. PATENT DOCUMENTS

| | | | | |
|---|---|---|---|---|
| 5,353,859 | A | 10/1994 | Oltahfer et al. | |
| 5,368,084 | A | 11/1994 | Hying et al. | |
| 5,540,269 | A | 7/1996 | Plumer | |
| 5,601,133 | A | 2/1997 | Krupke et al. | |
| 6,089,305 | A | 7/2000 | Gruben et al. | |
| 6,243,006 | B1 | 6/2001 | Rejc et al. | |
| 6,598,648 | B1 | 7/2003 | Schulte | |
| 6,964,289 | B2 | 11/2005 | Schulte | |
| 7,034,682 | B2 | 4/2006 | Beggs et al. | |
| 7,036,549 | B2 | 5/2006 | Coenraets | |
| 7,151,450 | B2 | 12/2006 | Beggs et al. | |
| 7,665,506 | B2 | 2/2010 | Coenraets | |
| 7,762,304 | B2 | 7/2010 | La Marca et al. | |
| 8,037,921 | B2 | 10/2011 | Dondlinger et al. | |
| 8,360,132 | B2 | 1/2013 | Drifka | |
| 8,857,498 | B2 | 10/2014 | Dondlinger et al. | |
| 9,140,063 | B2 | 9/2015 | Eggert et al. | |
| 9,222,304 | B2 | 12/2015 | Casey et al. | |
| 9,410,372 | B2 * | 8/2016 | Hanuka | G08B 13/22 |
| 9,493,984 | B2 | 11/2016 | Casey et al. | |
| 9,631,427 | B2 * | 4/2017 | Vandermillen | E06B 9/70 |
| 9,671,523 | B2 | 6/2017 | Gelineau et al. | |
| 9,970,230 | B2 | 5/2018 | Scholten | |
| 10,000,958 | B2 * | 6/2018 | Evans | E06B 9/88 |
| 10,087,049 | B2 | 10/2018 | Collins et al. | |
| 10,619,397 | B2 | 4/2020 | Gregoriou | |
| 10,794,116 | B2 * | 10/2020 | Kanuri | E06B 9/88 |
| 11,708,722 | B2 * | 7/2023 | Beggs | E06B 9/13 160/270 |
| 11,732,519 | B2 * | 8/2023 | Pincher | E05F 15/40 160/1 |
| 2007/0277943 | A1 | 12/2007 | Boerger et al. | |
| 2008/0022596 | A1 | 1/2008 | Boerger et al. | |
| 2009/0313898 | A1 | 12/2009 | Manaras | |
| 2010/0032105 | A1 | 2/2010 | Drifka | |
| 2010/0325959 | A1 | 12/2010 | De Coi et al. | |
| 2013/0062511 | A1 | 3/2013 | De Coi et al. | |
| 2014/0110064 | A1 | 4/2014 | Eggert et al. | |
| 2014/0305600 | A1 | 10/2014 | Casey et al. | |
| 2014/0345812 | A1 | 11/2014 | Casey et al. | |
| 2016/0348429 | A1 | 12/2016 | Frede | |
| 2016/0348430 | A1 | 12/2016 | Lorenzani et al. | |
| 2016/0369557 | A1 | 12/2016 | Vandermillen et al. | |
| 2017/0218683 | A1 | 8/2017 | Shanahan et al. | |
| 2017/0254141 | A1 | 9/2017 | Iglesias Ballester | |
| 2019/0071912 | A1 * | 3/2019 | Evans | E05F 15/42 |
| 2019/0231105 | A1 | 8/2019 | Pointeau | |
| 2020/0173231 | A1 | 6/2020 | Drifka et al. | |
| 2021/0071476 | A1 * | 3/2021 | Beggs | E06B 9/581 |
| 2021/0363806 | A1 | 11/2021 | Pincher | |
| 2022/0049548 | A1 * | 2/2022 | Eggenberger | H05K 7/20836 |
| 2022/0356758 | A1 | 11/2022 | Lewan et al. | |

OTHER PUBLICATIONS

International Searching Authority, "International Preliminary Report on Patentability," issued in connection with International Application No. PCT/US2020/049931, dated Mar. 9, 2020, 14 pages.

International Searching Authority, "Invitation to Pay Additional Fees and, where applicable, Protest Fee," issued in connection with International PCT application No. PCT/US2020/049931, dated Dec. 8, 2020, 17 pages.

International Searching Authority, "Written Opinion," issued in connection with International Application No. PCT/US2020/049931, dated Mar. 25, 2021, 13 pages.

United States Patent and Trademark Office, "Notice of Allowability" issued in U.S. Appl. No. 17/016,019, dated May 30, 2023, (3 pages).

International Searching Authority, "International Search Report," issued in connection with International Application No. PCT/US2020/049931, dated Mar. 25, 2021, 7 pages.

United States Patent and Trademark Office, "Non-Final Action" issued in U.S. Appl. No. 17/016,019 dated Feb. 14, 2022 (21 pages).

Indian Patent Office, "Examination Report", issued in connection with Indian Patent Application No. 202217012837, dated Jul. 25, 2022, 6 pages.

United States Patent and Trademark Office, "Final Action" issued in U.S. Appl. No. 17/016,019 dated Sep. 26, 2022 (12 pages).

United States Patent and Trademark Office, "Advisory Action" issued in U.S. Appl. No. 17/016,019, dated Nov. 28, 2022 (3 pages).

United States Patent and Trademark Office, "Notice of Allowance and Fee(s) Due" issued in U.S. Appl. No. 17/016,019, dated Mar. 3, 2023 (8 pages).

IP Australia, "Examination Report No. 1 for Standard Patent Application," issued in connection with Australian Patent Application No. 2020346784, dated Apr. 27, 2023, 4 pages.

China National Intellectual Property Administration, "First Office Action," issued in connection with Chinese Application No. 202080077254.7, dated Aug. 10, 2023, 13 pages.

Australian Government, IP Australia, "Notice of acceptance for patent application," issued in connection with Australian Patent Application No. 2020346784, dated Oct. 24, 2023, 3 Pages.

European Patent Office, "Communication under Rule 71(3) EPC—Intention to Grant," issued in connection with European Patent Application No. 20 776 020.8, dated Dec. 13, 2023, 90 pages.

* cited by examiner

APPARATUS AND METHODS FOR DOOR CURTAIN BREAKAWAY DETECTION

RELATED APPLICATIONS

This patent arises from a continuation of U.S. patent application Ser. No. 17/016,019, which was filed on Sep. 9, 2020, and which claims the benefit of U.S. Provisional Pat. App. No. 62/897,790, which was filed on Sep. 9, 2019. Priority to U.S. patent application Ser. No. 17/016,019, and U.S. Provisional Pat. App. No. 62/897,790 is claimed. U.S. patent application Ser. No. 17/016,019, and U.S. Provisional Pat. App. No. 62/897,790 are incorporated herein by reference in their entireties.

FIELD OF THE DISCLOSURE

This disclosure relates generally to door curtains and, more particularly, to apparatus and methods for door curtain breakaway detection.

BACKGROUND

Door curtains of breakaway doors can be partially displaced when impacted in a direction non-parallel to the direction of the door curtain's travel. When a sufficient force to displace a door curtain impacts the door curtain of a breakaway door, the door curtain exits a vertical channel within which the door curtain normally travels. The breakaway door may then restore the door curtain to a normal operational state within the channel either via a manual refeed operation, such as a user repositioning the door curtain within the channel, or by an automated refeed operation, such as the door curtain being pulled through a refeed mechanism.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
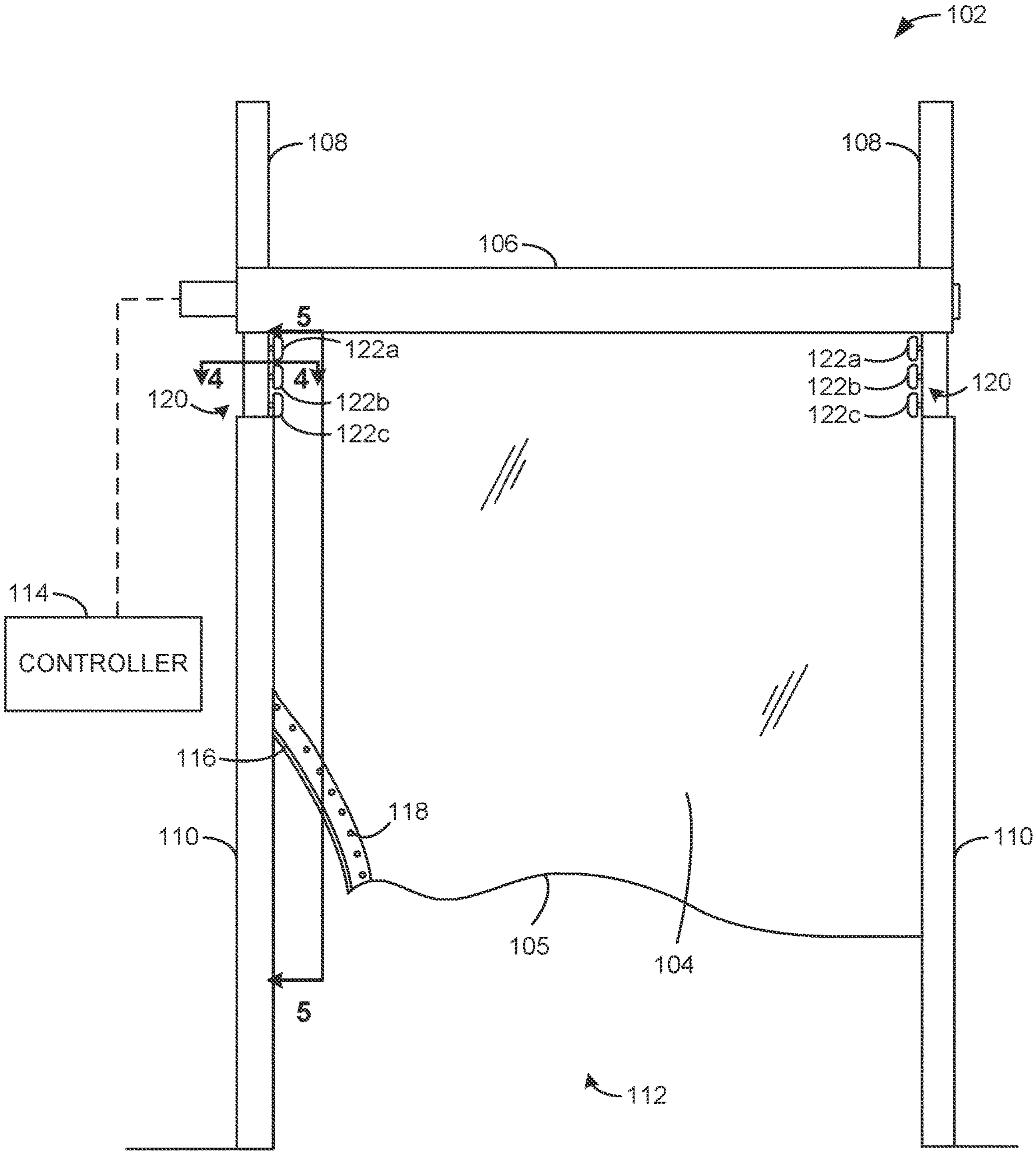
FIG. 1 is a front view of an example door constructed in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Breakaway doors provide a failsafe mechanism for automatic door operation. In the event that an automated door fails to actuate (or fails to actuate with sufficient speed) from a closed position to an open position when a vehicle or person approaches the breakaway door, an impact to the door due to the vehicle and/or person colliding with a door curtain of the breakaway door may result in a displacement of the door curtain from its normal position (e.g., to a breakaway state) to reduce (e.g., prevent) damage to the vehicle and/or the door curtain and/or to reduce (e.g., prevent) injury to the person. However, repeated impacts to a door curtain of the breakaway door can result in eventual damage to the door curtain and/or to other components associated with the breakaway door.

Improper use and/or configuration of the breakaway door can exacerbate damage to the door curtain. For example, if a user repeatedly impacts the door curtain in reliance upon the door curtain's ability to breakaway from a normal state, the door curtain and/or other components of the breakaway door may experience wear at a higher rate than if the user attempts to avoid door curtain impacts with the breakaway design being used merely as a failsafe. Similarly, if the breakaway door is not configured correctly (e.g., if the positioning of actuation sensors to cause actuation of the door curtain is incorrect, if timing of the actuation is incorrect, if the amount of time the door remains open is incorrect, etc.), the components may incur damage due to wear. Such wear may result in excessive warranty claims at the cost of the manufacturer. With conventional breakaway doors, without a person visually monitoring operation of the breakaway door, it may not be possible for an owner of a breakaway door and/or a manufacturer of the breakaway door to determine the extent of door curtain breakaway events that occur. A door curtain breakaway event occurs when at least a portion of one of the lateral edges of the door curtain moves out of a vertical guide within which the lateral edges of the door curtain travel during opening and closing of the door curtain under normal operations.

Example methods, apparatus, systems, and articles of manufacture (e.g., physical storage media) disclosed herein enable detection of door curtain breakaway events to enable adjustments, alerts, and/or corrective action to address potential problems in a breakaway door. In some example methods, apparatus, systems, and articles of manufacture disclosed herein, one or more sensors are structured to detect a force applied to a refeed roller of a breakaway door that indicates a breakaway event has occurred. In some example methods, apparatus, systems, and articles of manufacture disclosed herein, one or more sensors in a guide of the breakaway door are used to detect a presence of the door curtain within the guide. In some such examples, the door curtain may include an easily detectable component to travel within the guide (e.g., an RFID tag, a metal feature, etc.). In some example methods, apparatus, systems, and articles of manufacture disclosed herein, one or more switches directly engage the door curtain within the guide to determine a presence of the door curtain. In some examples, the presence of the door curtain within the guide can be utilized in conjunction with a known position of the door curtain (e.g., a closed position, an open position, or an intermediate position between the open and closed positions) to detect door curtain breakaway events. In some example methods, apparatus, systems, and articles of manufacture disclosed herein, a conductive feature (e.g., a conductive sphere including a metallic outer layer, a conductive solid sphere, etc.) on the door curtain completes a circuit when it contacts the refeed rollers, thereby indicating a refeed operation, further indicating the curtain was in a breakaway state.

Example methods, apparatus, systems, and articles of manufacture disclosed herein analyze data associated with door curtain breakaway events to generate alerts for breakaway events. In some examples, an example breakaway alert generator communicates alerts to maintenance personnel, a manufacturer, and/or another entity. In some example methods, apparatus, systems, and articles of manufacture disclosed herein, door curtain breakaway event data can be used to identify potential missing alignment features on the door curtain and, in some examples, to issue maintenance requests. In some examples, the door curtain breakaway event data can be analyzed to determine a specific location of impact that caused the door curtain breakaway event.

Example methods, apparatus, systems, and articles of manufacture disclosed herein utilize analysis of door curtain breakaway event data to enable corrective action to attempt to reduce the likelihood of future door curtain breakaway events occurring. In some examples, an actuation sensor position is adjusted to better sense approaching vehicles and/or persons. In some examples, a timing associated with an actuation sensor is adjusted to enable faster actuation of the door curtain. In some examples, an amount of time the door remains open is adjusted to account for specific behaviors, such as repeated occurrences of two or more vehicles and/or persons passing through the doorway in succession.

Figure 2:
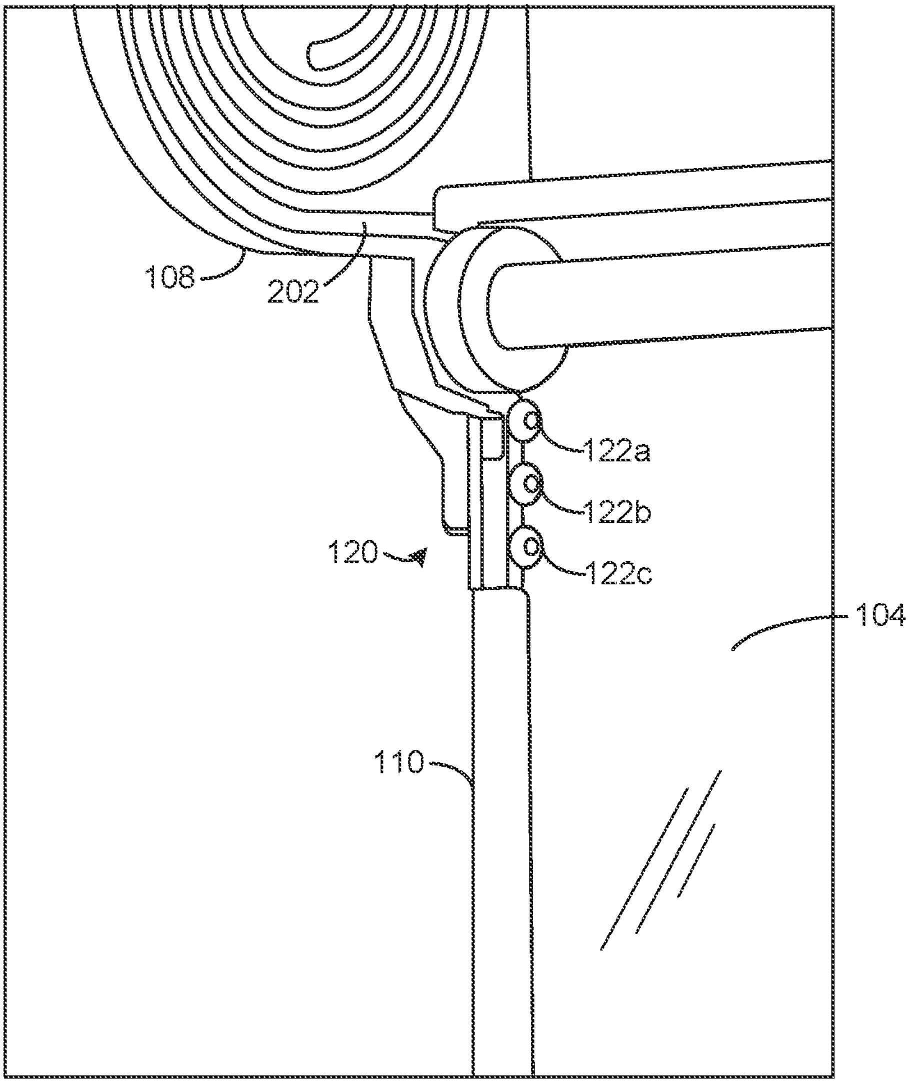
FIG. 2 is a perspective view of the upper left-hand corner of the example door of FIG. 1.

FIG. 1 is a front view of an example door 102 constructed in accordance with teachings disclosed herein. The door 102 of the illustrated example includes an example door curtain 104, which is movable in a vertical direction between an open position and a closed position. The door 102 of the illustrated example includes an example drive tube 106 including a horizontal axis around which the door curtain 104 rotates when the door curtain 104 is actuated to move between the open position and the closed position. When the door curtain 104 is moved to an open position, the door curtain 104 is at least partially stored within an example door curtain retainer 108. FIG. 2 includes a perspective view of the door curtain retainer 108, illustrating an example curvilinear slot 202 that the door curtain 104 occupies when open (e.g., retracted).

The door curtain 104 of the illustrated example extends between example tracks or guides 110. Specifically, the door curtain 104 of the illustrated example extends laterally between the guides 110 with opposing lateral edges 116 of the door curtain 104 retained within the guides 110 during normal operation to maintain blockage of an example doorway 112 when the door curtain 104 is in a closed position. The door curtain 104 has an example bottom edge 105. In some examples, the guides 110 also serve to retain the lateral edges 116 of the door curtain 104 as the curtain moves between open and closed positions during normal operations. However, the door curtain 104 can be displaced by an impact in a direction non-parallel to the door curtain 104 such that the edges of the door curtain 104 exit or breakaway from one or more of the guides 110. In some examples, the impact may cause the door curtain 104 to exit only one of the guides (e.g., a left one of the guides or a right one of the guides), while in some examples the impact may cause the door curtain 104 to exit both of the guides 110. For example, if a person and/or object (e.g. a vehicle such as a forklift) impacts the door curtain 104 in a direction non-parallel to the door curtain 104, the force of the impact may cause the door curtain 104 to exit the guide, thereby reducing the likelihood of injury to the person and/or damage to the object. Enabling the door curtain 104 to breakaway in this manner may also reduce the likelihood of damage to the door curtain 104 and/or other components of the example door 102. In some examples, the door 102 is an automated door, such that when a person and/or vehicle approaches the door, one or more sensors communicate feedback signals to an example controller 114 indicating the approach of the person and/or vehicle. In some such examples, the controller 114 causes the door curtain 104 to move to the open position in response to the sensor feedback to unblock the doorway 112 and enable the person and/or vehicle (and/or other traffic) to pass through. However, even in examples where the actuation of the door is automated, delayed actuation, failure to actuate (e.g., due to faulty sensors), and/or other factors may cause persons and/or objects to impact the door curtain 104.

The controller 114 of the illustrated example provides commands to components of the door 102 (e.g., a motor, an actuator, etc.) to cause the door curtain 104 to move to the open position or extend to the closed position in response to signals from one or more sensors and/or commands issued by an operator. The controller 114 of the illustrated example receives signals from one or more sensors associated with the door 102 which enable detection of door curtain breakaway event corresponding to the door curtain 104 entering a breakaway state. In some examples, the controller 114 analyzes the door curtain breakaway event data to generate reports regarding door curtain breakaway events, to provide recommendations to rectify a cause of door curtain breakaway events, to cause adjustments to one or more actuators and/or sensors, to issue maintenance alerts, and/or to take other actions based on analysis of the door curtain breakaway event data. Further detail of the structure of the controller 114 is illustrated and described in connection with FIG. 14, and techniques implemented by the controller 114 are illustrated and described in connection with FIGS. 15-21.

As used herein, when the door curtain 104 is impacted with sufficient force to cause the edges of the door curtain 104 to exit one or more of the guides 110, the door is said to be in a "breakaway state." As used herein, when the door curtain 104 is retained by the guides 110 during normal operations, the door curtain 104 is in an "operational state." In the illustrated example of FIG. 1, the door curtain 104 has entered the breakaway state due to a portion of the door curtain 104 exiting the left-side (as viewed on the page) guide 110 of the example door 102. In particular, when a portion of the door curtain 104 below an upper end of the guide 110 breaks away from the guide 110, the door curtain 104 has entered the breakaway state.

An example lateral edge 116 of the door curtain 104 of the illustrated example is partially visible, as it has been removed from the left-side one of the guides 110. The lateral edge 116 is one of two lateral edges of the door curtain 104. The second lateral edge is on the right-side of the door curtain 104 opposite the lateral edge 116 on the left-side as viewed in FIG. 1, but the second lateral edge is obscured within the corresponding guide 110 in FIG. 1. As used herein, the lateral edge 116 refers to either of the lateral edges (e.g., the left-side or the right-side lateral edge) of the door curtain 104. In this example, both lateral edges 116 are substantially identical. Thus, while only one of the lateral edges 116 are shown, both lateral edges 116 include a plurality of example alignment features 118. The example alignment features 118 are protrusions extending from the door curtain 104 which help retain the lateral edges 116 of the door curtain in the guides 110. The example alignment features 118 of the illustrated example have a generally spherical shape, though the alignment features 118 may be any type of shape and/or any combination of shapes (e.g., different ones of the alignment features 118 may have different geometries).

When the door curtain 104 moves to the breakaway state, it is important that the door curtain 104 be restored to the operational state (e.g. by restoring the lateral edge 116 of the door curtain that was forced out of one of the guides 110 to be retained back within the corresponding guides 110). If the lateral edge 116 of the door remains removed from the one of the guides 110 while the door curtain 104 moves between the open and closed positions, the door curtain 104, the one of the guides 110, and/or other components of the door 102 may sustain damage due to wear. To avoid this, the door 102 includes example refeed roller assemblies 120 attached near the top of the guides 110. The refeed roller assemblies 120 of the illustrated example of FIG. 1 include a plurality of refeed rollers 122 arranged in alignment along the travel path of the door curtain 104 in a direction extending away from the guides 110. When the door curtain 104 is in a breakaway state and the controller 114 causes the door curtain 104 to be moved to the open position, the alignment features 118 on the door curtain 104 that are outside of the guide 110 will contact one or more of the refeed rollers 122 and be forced back into alignment with the corresponding guide 110, thereby restoring the door curtain 104 to the operational state.

Details of the refeed roller assemblies 120 of FIG. 1 are illustrated and described in association with FIGS. 2, 3A, 3B, and 4 below. FIG. 2 is a perspective view of the upper left-hand corner of the example door 102 of FIG. 1. The perspective view of FIG. 2 illustrates three example refeed rollers 122*a*, 122*b*, 122*c* of one of the refeed roller assemblies 120. In some examples, the construction and operation of the two refeed roller assemblies 120 is substantially identically. Accordingly, although the following discussion is provided with respect to the refeed roller assembly 120 shown in FIG. 2, the discussion applies similarly to the other refeed roller assembly 120 of FIG. 1 that is not shown in the detailed perspective view of FIG. 2.

Figure 3A:
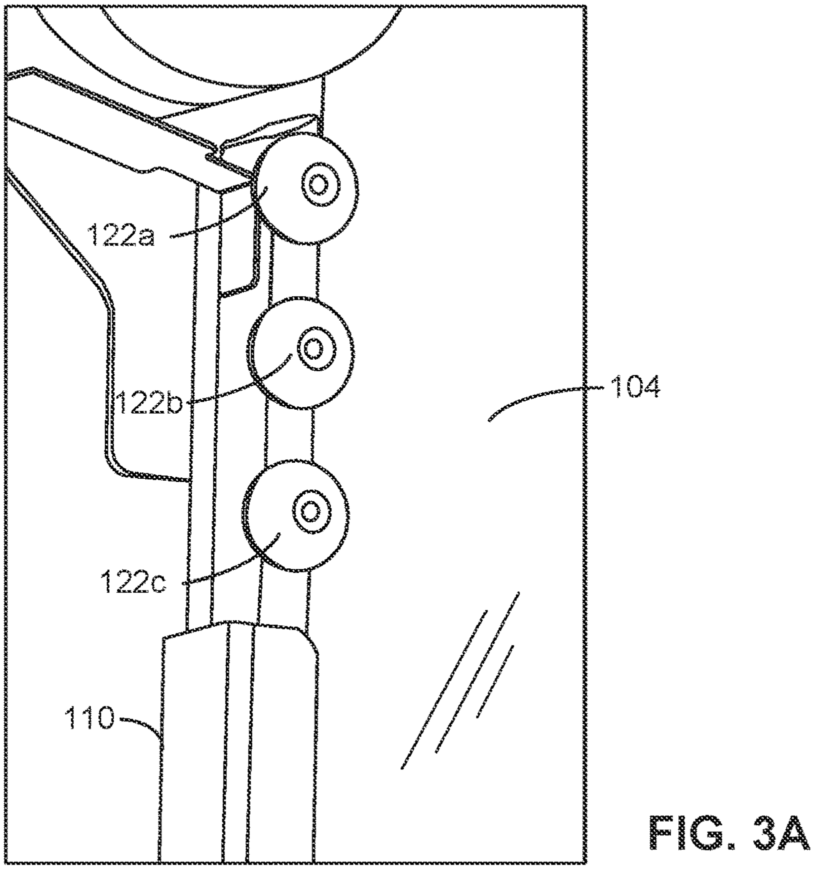
FIG. 3A is a detailed view of an example refeed roller assembly of the example door of FIG. 1.
Figure 3B:
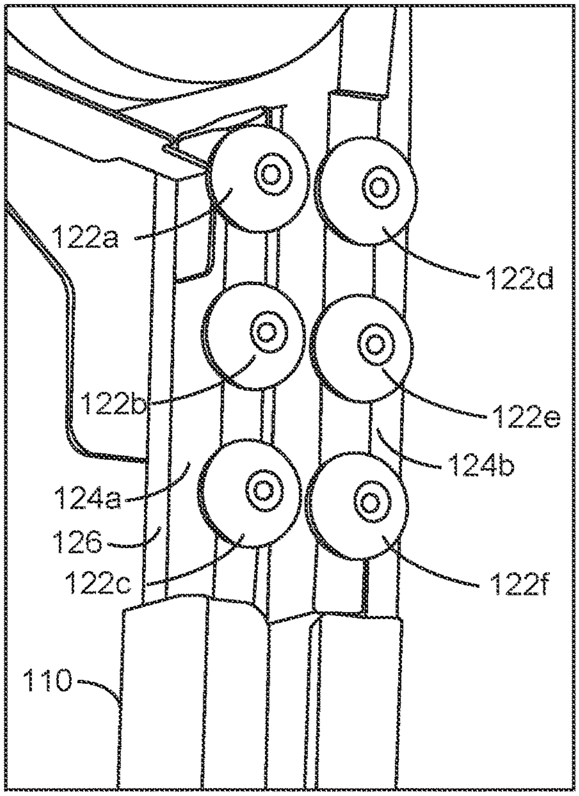
FIG. 3B is a detailed view of the example refeed roller assembly illustrated in FIG. 3A, but with the door curtain in a fully open position.

The three refeed rollers 122*a*, 122*b*, 122*c* of the refeed roller assembly 120 of FIG. 2 are spaced apart vertically. In the illustrated example, the refeed roller assembly 120 includes three refeed rollers 122*a*, 122*b*, 122*c* on one side of the door curtain 104, and three refeed rollers 122*d*, 122*e*, 122*f* (FIG. 3B) on the other side of the door curtain 104. For comparison, FIG. 3A illustrates a detailed view of an example refeed roller assembly 120 of the example door 102 of FIG. 1 with the door curtain in a closed position, while FIG. 3B is a detailed view of the example refeed roller assembly 120 illustrated in FIG. 3A, but with the door curtain 104 in a fully open position. In FIG. 3B, all six refeed rollers 122*a*, 122*b*, 122*c*, 122*d*, 122*e*, 122*f* are visible. The door curtain 104 translates vertically in the guide 110 and moves between pairs of the refeed rollers 122. For example, the first refeed roller 122*a* and the fourth refeed roller 122*d* act as a first pair, the second refeed roller 122*b* and the fifth refeed roller 122*e* act as a second pair, and the third refeed roller 122*c* and the sixth refeed roller 122*f* act as a third pair. For purposes of explanation and brevity, as used herein, "the refeed roller 122" may refer to any one of the refeed rollers 122*a*, 122*b*, 122*c*, 122*d*, 122*e*, 122*f*, and "the refeed rollers 122" may refer to any grouping of the refeed rollers 122*a*, 122*b*, 122*c*, 122*d*, 122*e*, 122*f*.

The refeed rollers 122 of the illustrated example are shaped such that when one of the alignment features 118 contacts one of the refeed rollers 122 during a refeed operation as the door curtain 104 opens, the one of the alignment features 118 is forced inward and moved into vertical alignment with the guide 110, and into vertical alignment with the guide 110. The refeed rollers 122 of the illustrated example are capable of moving (e.g., translating and/or rotating) in response to a force from one of the alignment features 118. In the illustrated example, several pairs of the refeed rollers 122 are present to capture the alignment features 118 and keep the door curtain 104 within the guide 110. When in an operational state (e.g., when the door curtain 104 is not in the breakaway state), the refeed rollers 122 are spaced apart from the alignment features 118 because the alignment features 118 are retained within the guides 110. In some examples, the refeed roller assembly 120 may include additional pairs of refeed rollers 122. In other examples, the refeed roller assembly 120 may include less than three pairs of refeed rollers 122.

Figure 4:
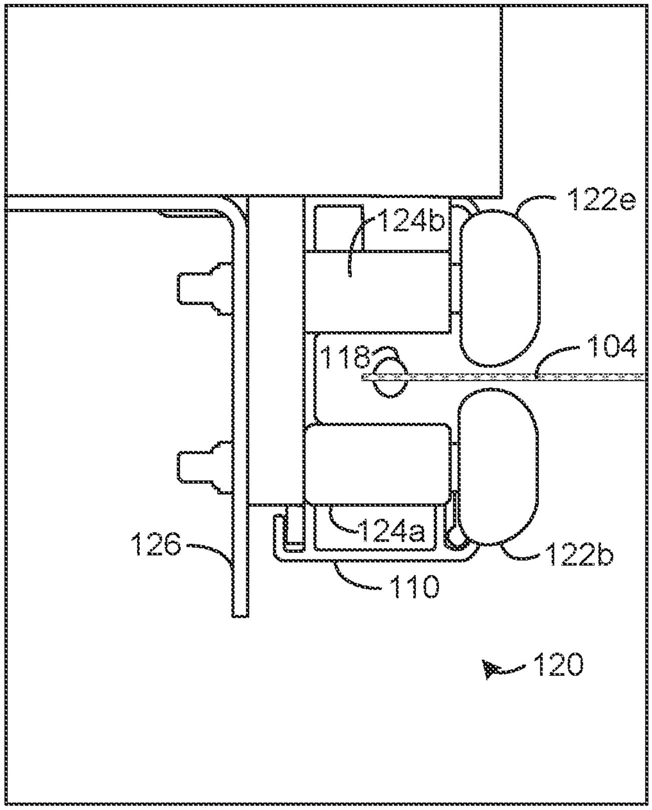
FIG. 4 is a cross-sectional view of the example refeed roller assembly of FIG. 1 taken along line 4-4.

The refeed rollers 122 are mounted to example first and second refeed blocks 124*a*, 124*b*, which connect to an example frame 126 of the door 102. The refeed blocks 124*a*, 124*b* of the illustrated example are mounted directly above the guide 110. In the illustrated example, the guide 110 is also attached to the frame 126 of the door 102. FIG. 4 is a cross-sectional view of the example refeed roller assembly 122 of FIG. 2 taken along line 4-4 shown in FIG. 1. As illustrated in FIG. 4, the alignment features 118 of the door curtain 104 are retained behind (e.g., to the left of, in the view of FIG. 4.) the refeed rollers 122*b*, 122*e* and the guide 110 that is aligned with the refeed rollers. The refeed rollers 122 of the illustrated example directly contact the alignment features 118 during a refeed operation. The refeed roller pairs (e.g., refeed rollers 122*b*, 122*e*) of the illustrated example are positioned such that the alignment feature 118 is incapable of fitting directly between the refeed rollers 122*b*, 122*e*, and thus, when the alignment feature 118 is forced upward toward the top of the door 102 (e.g., due to the force from a motor) during opening of the door curtain 104, the alignment feature 118 is forced by the refeed rollers 122 back into vertical alignment with the guide 110 to return the door curtain 104 to a normal operational state. The refeed rollers 122 are directly connected to the refeed blocks 124*a*, 124*b*. In some examples, the refeed rollers 122 may have another geometry which similarly enables restoration of the alignment features 118 within the guide 110.

Figure 5:
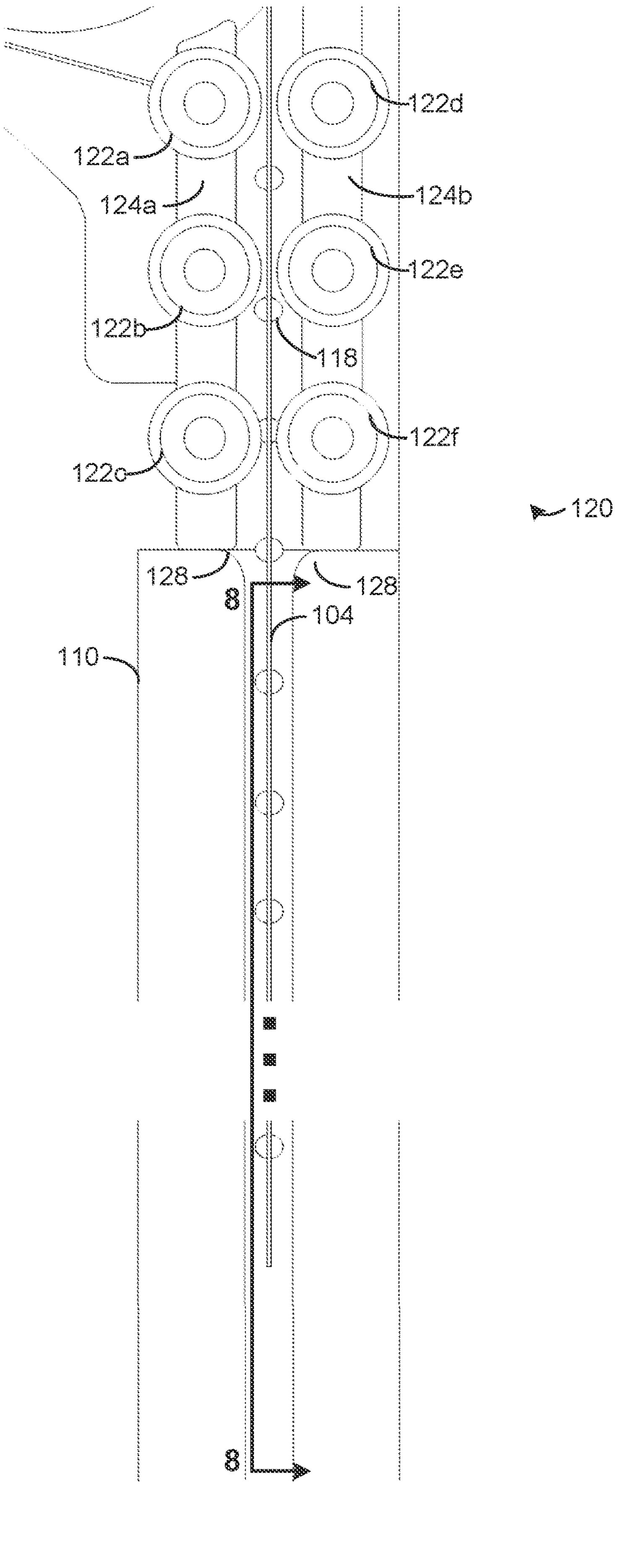
FIG. 5 is a cross-sectional view of the example refeed roller assembly of FIG. 1 taken along line 5-5, but with the door curtain in an operational state.

FIG. 5 is a cross-sectional view of the example refeed roller assembly 120 of FIG. 1 taken along line 5-5, but with the door curtain in an operational state, as opposed to the breakaway state illustrated in FIG. 1. In FIG. 5, the door curtain 104 is in an operational state, as the alignment features 118 are behind the refeed rollers 122, and the lateral edge 116 of the door curtain is retained within the guide 110. The guide 110 includes example retention strips 128 on either side of the door curtain 104 to aid in retaining the lateral edge 116 of the door curtain 104 within the guide 110. In the illustrated example, the retention strips 128 extend inward toward the door curtain 104 with a gap therebetween dimensioned to be greater than a thickness of the door curtain 104. In this manner, the door curtain 104 is able to freely translate between open and closed positions along the gap between the retention strips 128. However, the gap is dimensioned to be less than the size of the alignment features 118 so as to retain the alignment features 118 within the guide 110 as the door curtain 104 moves in the normal operational state. In some examples, the retention strips 128 are flexible to enable the alignment features 118 to pass through the gap between the strips 128 when a sufficient force is applied. That is, if a relatively small force is applied to the door curtain 104 (e.g., a two-pound force applied perpendicularly to the door curtain 104), the alignment feature 118 may interfere with or engage the retention strips 128 but remain within the guide 110. However, if a relatively larger force (e.g., a five-pound force, a ten-pound force, etc.) is applied perpendicularly to the door curtain 104, the retention strips 128 may flex to allow the alignment features 118 to exit alignment with the guide 110 and allow the door curtain 104 to enter the breakaway state.

In the illustrated example of FIG. 5, the alignment features 118 are distributed at an even spacing along the lateral edge 116 of the door curtain 104. In some examples, the alignment features 118 may be spaced at an irregular interval. In some examples, the positioning of the alignment features 118 is not consistent across a length of the lateral edge 116 of the door curtain. The alignment features 118 may include any material. In some examples disclosed herein, the alignment features 118 are partially and/or wholly conductive. In some examples disclosed herein, the alignment features 118 include a magnetic material.

Example methods, apparatus, systems, and articles of manufacture (e.g., physical storage media) disclosed herein include one or more sensing systems to determine when the door curtain 104 enters the breakaway state, or transitions from the breakaway state to the operational state (e.g., during a refeed operation).

Figure 6:
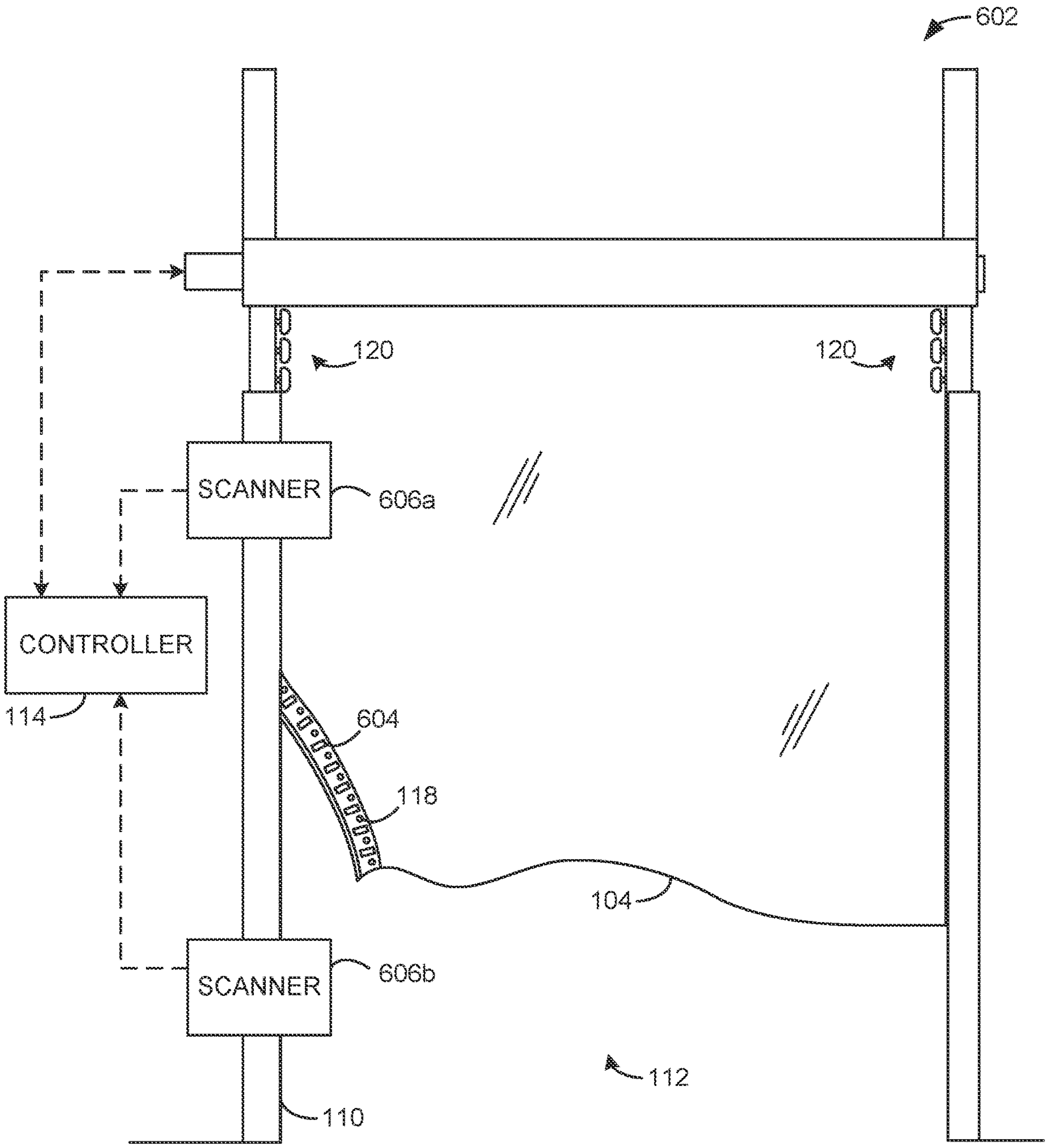
FIG. 6 is a front view of another example door similar to the example door of FIG. 1 but including an example first door curtain breakaway detection system.

FIG. 6 is a front view of another example door 602 similar to the example door 102 of FIG. 1 but including an example first door curtain breakaway detection system. The first door curtain breakaway detection system includes example tags 604 affixed to lateral edges 116 of the door curtain 104. The tags 604 of the illustrated example are positioned in alternation with the alignment features 118 along the lateral edges 116. Any number of tags 604 may be affixed to the lateral edges 116 of the door curtain 104 to detect a presence of the door curtain 104 in the guide 110. Thus, in some examples, more than one alignment feature 118 may be located between adjacent ones of the tags 604. In some examples, each of the lateral edges 116 includes only one tag 604. In some such examples, the single tag 604 is located near a bottom or leading edge of the door curtain 104 because the bottom corner of the door curtain 104 is often the most likely portion of the curtain to be forced out of the guide 110 due to an impact with the curtain. In some examples, the tags 604 may be integrated in, or integral to, the alignment features 118.

The tags 604 of the illustrated example are radio-frequency identification (RFID) tags. In some examples, the tags are Bluetooth Low Energy (BLE) tags, optical tags (e.g., barcodes, Quick Response (QR) codes, symbols for optical recognition, etc.), or any other type of tags to enable detection of the lateral edges 116 of the door curtain 104 being within the corresponding guides 110.

The first door curtain breakaway detection system includes example scanners 606*a*, 606*b*. The scanners 606*a*, 606*b* of the illustrated example are mounted to the guide 110 to detect the door curtain 104 within the guide 110. While two scanners 606*a*, 606*b* are illustrated for simplicity in FIG. 6, the door 602 can include any quantity of scanners on either of the guides 110 (the right-side one of the guides 110 can include scanners as well). For instance, in some examples, only one scanner may be positioned on either side the door curtain 104. In other examples, three or more scanners may be positioned on a single side of the door curtain 104. In some examples, there may be more scanners associated with one lateral edge 116 of the door curtain 104 than are associated with the other lateral edge. The example scanners 606*a*, 606*b* of the illustrated example are capable of detecting the tags 604 when the tags 604 are within a vicinity of the scanners 606*a*, 606*b* (e.g., within five inches, within ten inches, etc.). For example, the scanners 606*a*, 606*b* may be oriented toward the inside of the guide 110 where the lateral edge 116 of the door curtain 104 passes through the guide 110.

The illustrated example includes the first scanner 606*a* at an upper portion of the guide 110, which is useful to detect a presence of the door curtain 104 within the guide 110 at a position directly under the refeed roller assembly 120. If the door curtain 104 moves to a fully open position (e.g., where no portion of the door curtain 104 extends across the doorway 112), then the entirety of the door curtain 104 that extends below the position of the scanner 606*a* when the door curtain 104 is in the closed position will pass by the scanner 606*a* during normal operations. By contrast, if any portion of the door curtain 104 is broken away from the guide 110, that portion of the door curtain 104 will not be detected by the scanner 606*a* as the door curtain 104 moves from a closed position to the open position. Based on the failure of the scanner 606*a* to detect a portion of the door curtain 104 when such is expected based on the position and movement of the curtain, the breakaway state may be detected. In some examples the door 602 may be configured for partially-open operation. In some such examples, the door curtain 104 only opens to a partially-open position (e.g., wherein a portion of the door curtain 104 remains extended across a first portion of the doorway 112 while a second portion of the doorway 112 is unobstructed by the door curtain 104). For example, a user may prefer that the door only open to a partially open position to accommodate pedestrian traffic, or if vehicles traveling through the doorway are not expected to exceed a specific height. Utilization of this partially-open position helps conserve energy utilized by the motor to actuate the door curtain 104, and conserve energy due to potential HVAC differences at different sides of the door curtain 104.

If the door 602 is to open the door curtain 104 to the partially-open position, it may be advantageous to utilize both the first scanner 606*a* and the second scanner 606*b*, where the second scanner 606*b* is mounted lower on the guide 110 (e.g., below the height of the bottom edge of the door curtain 104 when in the partially-open position) to detect a breakaway state that occurs due to separation of the door curtain 104 from the guide 110 toward the bottom edge of the door curtain 104. In some such examples, when the second scanner 606*b* communicates data to the controller 114 and a breakaway state is detected, the controller 114 can cause the door 602 to move to a fully open position to enable the alignment features 118 toward the bottom of the door curtain 104 to move through the refeed roller assemblies 120 to restore the curtain to the normal operational state. If the door 602 is to open the door curtain 104 to a partially-open position, and only the first scanner 606*a*, toward the top of the guide 110 is utilized, a breakaway that occurs toward the bottom of the door curtain 104 may not be detected. Hence, one or more of the scanners 606*a*, 606*b* can be attached to the guide 110 to detect the breakaway state based on the specific configuration of the door 602. Any number of scanners may be utilized, and at any position along the guides 110.

The scanners 606*a*, 606*b* of the illustrated example are RFID scanners. In some examples, the scanners 606*a*, 606*b* are optical scanners, BLE scanners, and/or any other type of scanner suitable to detect the tags 604. The scanners 606*a*, 606*b* communicate data to the controller 114 to enable the controller 114 to determine whether the door curtain 104 is in an operational state or a breakaway state and to determine characteristics of the breakaway state. For example, the controller 114 can determine whether the door curtain 104 is in the breakaway state based on a vertical position of the door curtain (e.g., as determined based on the motor and/or driving element for the door curtain 104) and data from the scanners 606*a*, 606*b*. For example, if the door curtain 104 is known to be approximately halfway open and is moving toward the fully open position, and the first scanner 606*a* has not detected the tags 604 for a threshold period of time (or for a threshold number of expected tags) during motion of the door curtain, the controller 114 can determine that the door curtain 104 may be in the breakaway state. Conversely, the controller 114 will not indicate that the door curtain 104 is in the breakaway state in response to the second scanner 606*b* not detecting the tags 604 during this motion because the bottom edge of the door curtain 104 is known to be above the second scanner 606*b* such that the detection of the tags 604 would not be expected. In some examples, if only a single tag 604, or a small quantity of the tags 604, is not detected when it is expected to be detected (e.g., based on a position of the bottom edge of the door curtain 104 and a known speed and direction of motion of the door curtain 104), the controller 114 may determine that a maintenance alert should be issued to determine whether one or more of the tags 604 is not operational or is missing.

Further, in some examples, the tags 604 are serialized to enable decoding of location information corresponding to a vertical position of the tags 604. For example, individual ones of the tags 604, when detected by one of the scanners 606*a*, 606*b*, may communicate a vertical position of the detected tags 604. If the controller 114 determines that a plurality of tags (e.g., a threshold quantity of tags) has not been detected at positions which should have passed one of the scanners 606*a*, 606*b*, the controller 114 can determine the door curtain 104 is in the breakaway state. Similarly, the controller 114 may compare an elapsed time of motion to a threshold time period during which tags 604 are expected to be detected based on a known spacing of the tags and a known speed of the door curtain 104 during actuation. For example, if the door curtain is expected to be passing one of the scanners 606*a*, 606*b*, and the one of the scanners 606*a*, 606*b* does not detect any of the tags 604 for a threshold duration, the controller can determine the door curtain 104 is in the breakaway state.

Figure 7A:
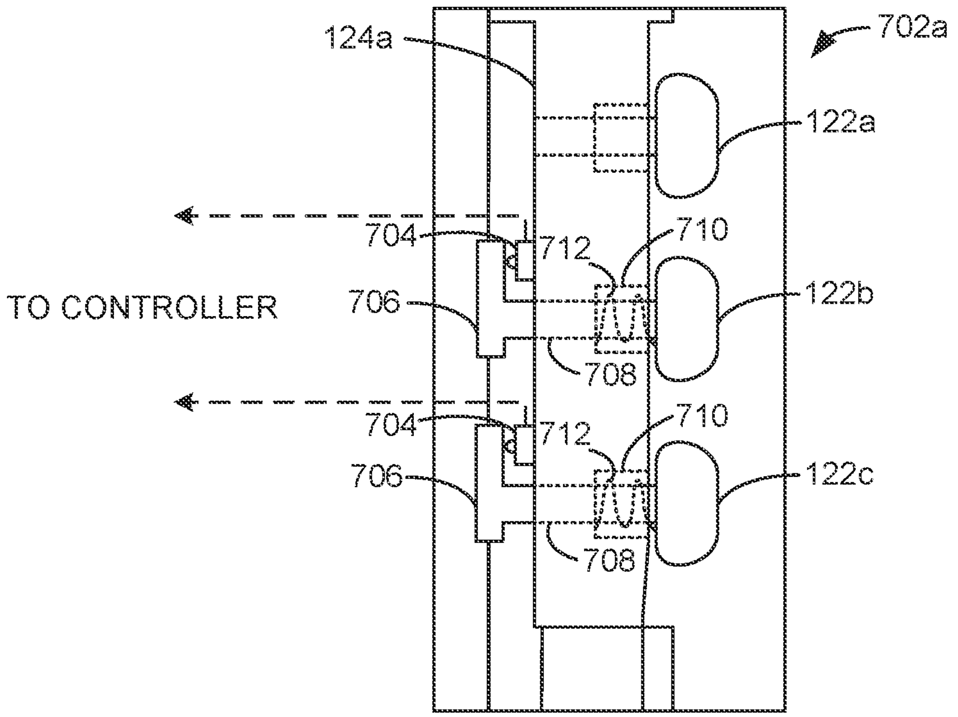
FIG. 7A is a front view of another example refeed roller assembly similar to the refeed roller assembly of FIGS. 3A-3B, but including a second example door curtain breakaway detection system.

FIG. 7A is a front view of a second example refeed roller assembly 702*a* similar to the refeed roller assembly 120 of FIGS. 3A-3B, but including a second example door curtain breakaway detection system. The second door curtain breakaway system includes example switches 704 to engage with example rear portions 706 of support structure for the respective second refeed roller 122*b* and the third refeed roller 122*c*. The first and second refeed rollers 122*b*, 122*c* are additionally connected to support structure including example center portions 708, which extend through the refeed block 124*a* and connect respective ones of the refeed rollers 122*a*, 122*b* to the corresponding rear portions 706. The refeed block 124*a* includes example cavities 710, which include example springs 712 to bias the refeed rollers 122 and the support structure connected to the refeed rollers 122 toward the switches 704.

Figure 7B:
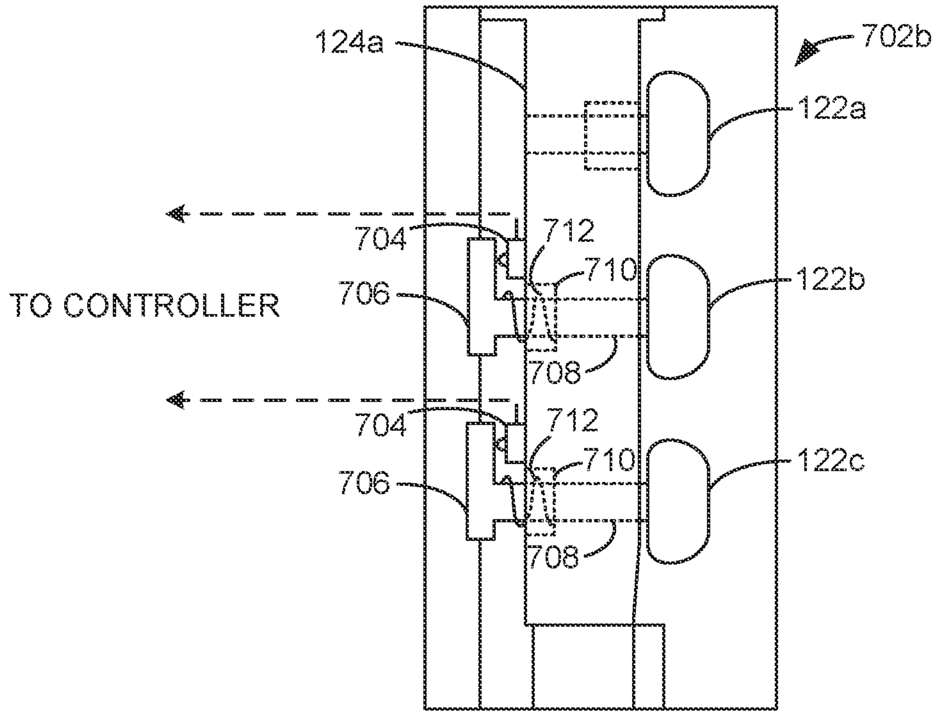
FIG. 7B is a front view of another configuration of the second example door curtain breakaway detection system of FIG. 7A.

In a first example configuration of the second refeed roller assembly 702*a* illustrated in FIG. 7A, the cavities 710 are on an inner-side of the refeed block 124*a* proximate the refeed rollers 122, and the springs 712 are compression springs to bias the refeed rollers 122 to the right as viewed in the illustrated example. In a second example configuration of the second refeed roller assembly 702*b* illustrated in FIG. 7B, the cavities 710 are positioned on an outer-side of the refeed block 124*a* proximate the rear portions 706 of the refeed rollers 122, and the springs 712 are tension springs to bias the refeed rollers 122 and the support structure connected to the refeed rollers 122 to the right as viewed in the illustrated example. In both the example of FIG. 7A and the example FIG. 7B, the switches 704 are normally depressed (e.g., when a refeed operation is not occurring) due to the biasing force created by the springs 712. However, when the door curtain 104 is being restored from a breakaway state, the alignment features 118 that were forced out of the guide 110 may engage one or more of the refeed rollers 122 and cause the refeed rollers to move in opposition to one or more of the springs 712 until the corresponding switches 704 are no longer depressed. In some examples, the switches 704 may be alternatively configured such that the switches 704 are not engaged (e.g., not depressed) when the door curtain 104 is in the normal operational state, and are engaged during a refeed operation. In some examples, the switches 704 may be integrated within the refeed block 124*a*, or positioned on the opposite side of the refeed block 124*a* to engage the portions of the refeed rollers 122 that engage the alignment features 118.

While only two of the three visible refeed rollers 122*a*, 122*b*, 122*c* include the switches 704, any number of refeed rollers 122 may include the switches 704 to engage with rear portions 706 of the refeed rollers 122. In some examples, the lowest of the refeed rollers 122 (e.g., the third refeed roller 122*c*) is most likely to engage the alignment features 118, and thus is monitored using one of the switches 704. In the illustrated examples of FIGS. 7A and 7B, only the refeed rollers that are monitored by the switches 704 include the rear portions 706. In some examples, any combination of the refeed rollers 122 include the rear portions 706.

The switches 704 are communicatively coupled to the controller 114 to provide the controller 114 with signals indicative of whether the switches 704 are currently depressed or otherwise activated. The controller 114 can determine a refeed operation occurred (and therefore, the door curtain 104 must have been in the breakaway state) when one or more signals from one or more of the switches 704 changes. For example, the signals may be a binary signal, wherein a "1" represents the switch being engaged (e.g., indicating the roller is in its normal state, not being displaced during a refeed operation) and "0" represents the switch not being engaged (e.g., indicating the roller has been displaced during a refeed operation), or vice-versa. In some examples, a proximity sensor and/or other sensor may be used in addition to or instead of the switches 704.

Figure 8:
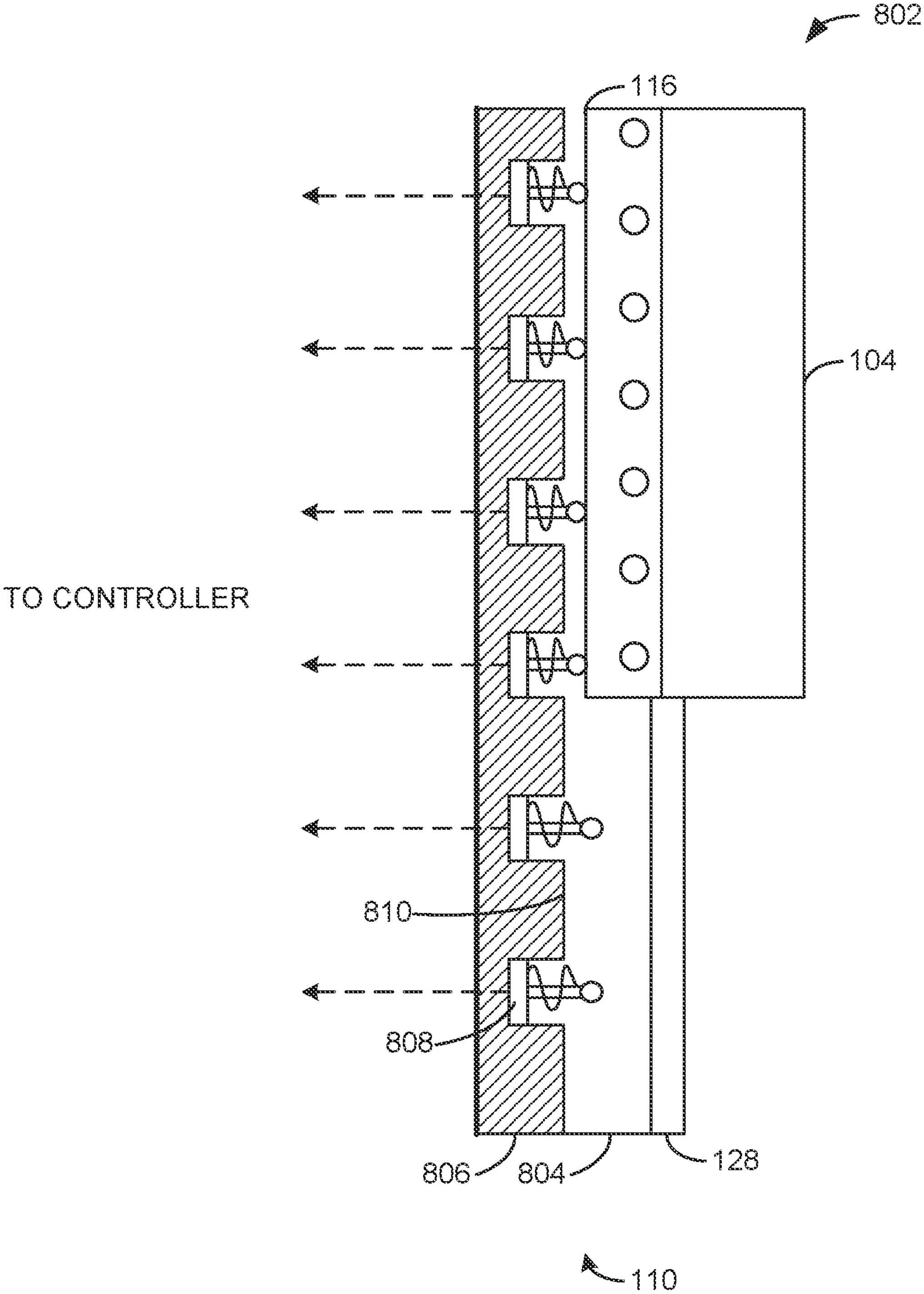
FIG. 8 is a cross-sectional view taken along line 8-8 of FIG. 5 showing an example third door curtain breakaway detection system installed within an example guide of an example door similar to the door of FIG. 1.

FIG. 8 is a cross-sectional view taken along line 8-8 of FIG. 5 of an example third door curtain breakaway detection system installed within the guide 110 of an example door 802 similar to the door of FIG. 1. The third door curtain breakaway detection system is installed in the guide 110 of the door 802. The guide 110 includes the retention strips 128, an example open portion 804 and an example seal portion 806. The open portion 804 is a vertical channel that the lateral edge 116 of the door curtain 104 (including the alignment features 118) translates within when in the normal operational state. The retention strips 128 retain the lateral edge 116 of the door curtain 104 within the open space of the guide 110. The seal portion 806 of the guide 110 provides a seal along the lateral edges 116 of the door curtain 104 to reduce airflow through the door 802 when the door curtain 104 is in the closed position. The seal portion 806 is substantially vertically parallel (e.g., within 10 degrees) to the open portion 804. For example, the seal portion 806 may be a seal (e.g., thermal insulation within the cavity of the guide 110) implemented to reduce energy costs for heating and air conditioning if there is a thermal gradient between spaces separated by the door 802.

In the third door curtain breakaway detection system, example switches 808 are embedded in (or installed in recesses of) the seal portion 806 of the guide 110. The seal portion 806 may include any number of the switches 808. In the illustrated example, the switches 808 are evenly spaced along a vertical length of the seal portion 806. In the illustrated example of FIG. 8, the switches 808 are spring-loaded, and are depressed by the door curtain 104 when the door curtain 104 is at a vertical position corresponding with respective ones of the switches 808. In some examples, a sensor (e.g., a proximity sensor) is utilized instead of the switches 808. In some examples, rather than embedding the switches 808 within the seal portion 806, the switches 808 are mounted on an external surface of the seal portion 806. That is, in some examples, the switches 808 are mounted on and extending off of an example surface 810 of the seal portion 806 of the guide 110 that faces towards the open portion 804 of the guide 110. In some examples, the door 802 does not include the seal portion 806. In some such examples, the switches 808 are mounted on another surface of the guide 110.

The switches 808 are communicatively coupled with the controller 114 to provide the controller 114 with signals indicative of whether the switches 808 are depressed or otherwise activated. In some examples, the switches 808 communicate a binary signal (e.g., a "1" if the switch 808 is in a depressed position and a "0" if the switch 808 is in an extended position, or vice-versa). The controller 114 can determine whether the door curtain 104 is in the guide 110 at a location of the switch based on a known vertical position of the door (e.g., as determined from the motor or other driving element) and based on signals from the switches 808 at known vertical heights. For example, if a switch is at a position above or equal to a position of the bottom edge of the door curtain 104, the switch should be depressed if the door curtain 104 is in the operational state. If the signal from the switch indicates it is not depressed (e.g. the door curtain 104 is not present) at such a position, then the controller 114 can determine the door curtain 104 is in the breakaway state.

Figure 9:
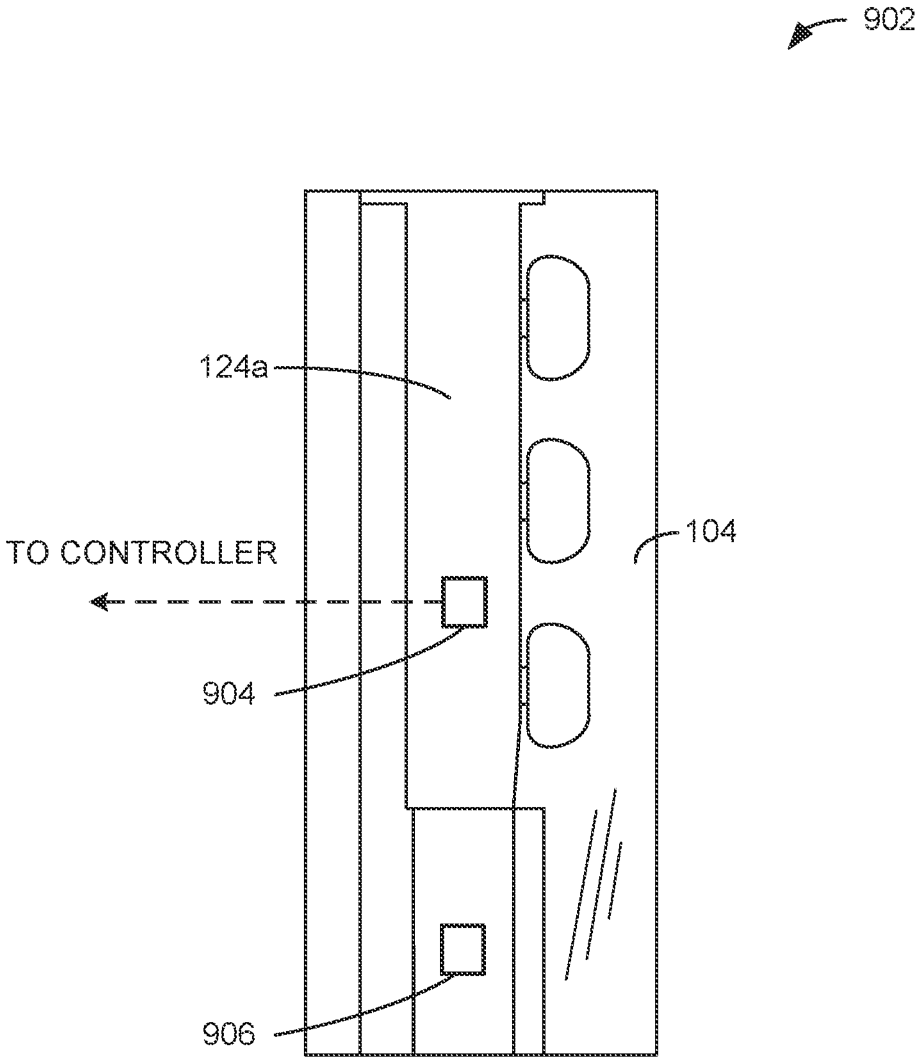
FIG. 9 is a front view of an example refeed roller assembly similar to the refeed roller assembly of FIGS. 3A-3B, but including a fourth example door curtain breakaway detection system.

FIG. 9 is a front view of an example refeed roller assembly 902 similar to the refeed roller assembly of FIGS. 3A-3B, but including a fourth example door curtain breakaway detection system. The fourth door curtain breakaway detection system includes an example sensor 904 to detect forces on and/or motion of the refeed block 124*a*. The sensor 904 of the illustrated example is an accelerometer. In some examples, the sensor 904 is integrated into the refeed block 124*a*. The sensor 904 communicates data to the controller 114 representing forces on the refeed block 124*a* and/or motion of the refeed block 124*a*. The controller 114 analyzes the data from the sensor 904 to determine whether the forces and/or motion represented in the data are likely to be associated with a refeed operation. For example, the controller 114 can recognize patterns during post-processing that are associated with refeed operations. In some examples, the controller 114 may be trained using a set of training data and may utilize machine learning techniques to identify characteristics in data from the sensor 904 that correspond to a refeed operation, as opposed to an impact to a frame component of the door 102, motion due to standard actuation of the door curtain 104, etc. In some examples, the controller 114 may infer a breakaway state based on the identification of a refeed operation.

In some examples, the door 102 includes one or more example additional sensor(s) 906 to provide baseline data regarding forces and/or motion on the door 102. For example, the controller 114 can compare forces and/or motion represented in the data from the sensor 904 on the refeed block 124*a* with forces and/or motion represented in data from the one or more additional sensor(s) 906 elsewhere on the door 102. Although the additional sensor(s) 906 is positioned adjacent the refeed block 124*a*, the additional sensor(s) 906 may be positioned farther away from the refeed block 124*a*. If the forces and/or motion are unique to the refeed block 124*a*, this may indicate a higher probability that a refeed operation occurred, relative to forces and/or motion that are experienced by another sensor on another part of the door 102. In some examples, the controller 114 can determine a portion of the door curtain 104 that broke away from the guide 110 based on known positions of the door curtain 104 and data from the sensor 904. For example, if the data from the sensor 904 indicates a refeed operation began when the bottom edge of the door curtain 104 was at a specific height, the controller 114 can determine that the portion of the door curtain 104 extending from the specific height of the bottom edge of the door curtain 104 up to the refeed roller assembly 902 broke away from the guide 110.

Figure 10A:
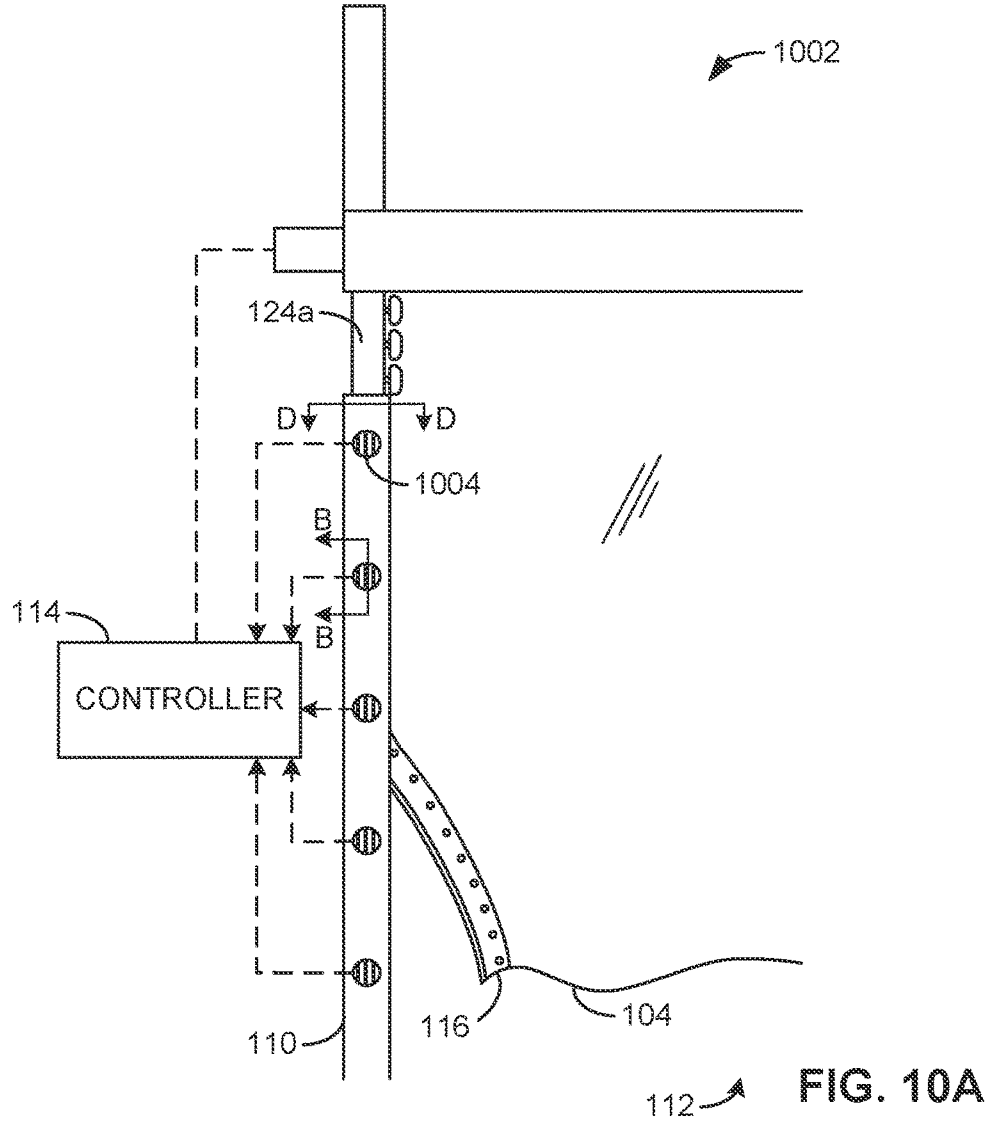
FIG. 10A is a partial view of an example door similar to the example door of FIG. 1, but including a fifth example door curtain breakaway detection system.
Figure 10B:
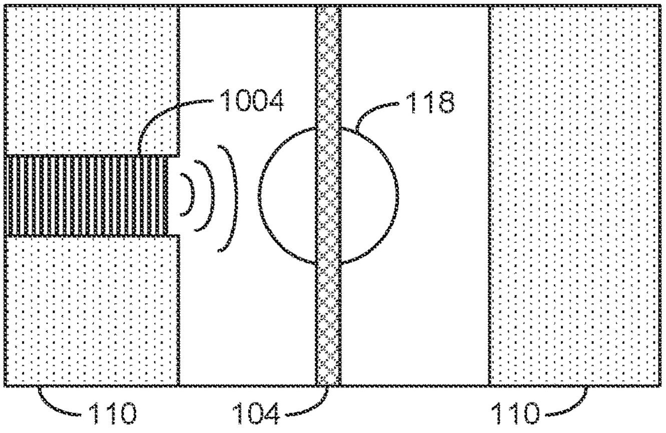
FIG. 10B is a cross-sectional view taken along line B-B of FIG. 10A.

FIG. 10A is a partial view of an example door 1002 similar to the example door 102 of FIG. 1, but including a fifth example door curtain breakaway detection system. The fifth example door curtain breakaway detection system includes example sensors 1004 mounted along the guide 110. The sensors 1004 of the illustrated example are oriented toward the center of the guide 110 (e.g., where the lateral edge 116 of the door curtain 104 is positioned when in the normal operating state) to enable detection of the door curtain 104. The sensors 1004 of the illustrated example detect the alignment features 118 on the lateral edge 116 of the curtain. FIG. 10B is a cross-sectional view taken along line B-B of FIG. 10A, illustrating the sensor 1004 detecting one of the alignment features 118 on the lateral edge 116 of the door curtain 104 as the door curtain 104 translates through the guide 110.

In some examples, the door 1002 includes only the top one of the sensors 1004 illustrated in FIG. 10A. In some such examples, the top one of the sensors 1004 can detect a breakaway event based on the absence of detection of ones of the alignment features 118 as the door curtain 104 moves to the open position. In some examples, the controller 114 can determine a portion of the door curtain 104 which broke away from the guide 110 based on counting the alignment features 118 as they pass. For example, if there are twenty alignment features 118 along the full length of the door curtain 104, and the sensors 1004 do not detect the bottom ten alignment features 118 when the door curtain 104 moved to the fully open position, it can be determined that the portion of the door corresponding to the bottom ten alignment features (e.g., the bottom half of the door curtain 104, if the alignment features are evenly vertically distributed) broke away from the guide 110. In some examples, due to the presence of multiples ones of the sensors 1004, a portion of the door curtain 104 which broke away from the guide 110 can be determined prior to the door curtain 104 moving to the fully open position. In some such examples, a position of the bottom edge of the door curtain 104 can be determined when the portion of the door curtain 104 broke away from the guide 110, based upon data from the sensors 1004 and known locations (e.g., lateral positions along the guide 110) of the sensors 1004. In some examples, the alignment features 118 are conductive. In some such examples, the sensors 1004 are inductive proximity sensors to detect the conductive material in the alignment features 118. In some examples, the door curtain 104 may include conductive material independent of the alignment features 118 that is detected by the sensors 1004. In some such examples, only a bottom one of the alignment features 118 may be conductive, and the inductive sensor can therefore determine whether the door curtain 104 entered a breakaway state (since the bottom of the door curtain 104 will become removed from the guide 110 regardless of the height at which the breakaway event initiates), but the data may not indicate the portion of the door curtain 104 which broke away from the guide 110.

Figure 10C:
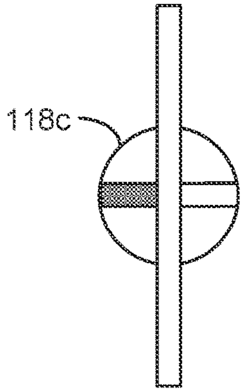
FIG. 10C is an alternative example alignment feature for use in the example door curtain breakaway detection system of FIGS. 10A and 10B with an alternative sensor type.

In some examples, the sensors 1004 are capacitive sensors (e.g., a capacitive proximity sensor) or ultrasonic proximity switches (e.g., an ultrasonic proximity sensor). In some such examples, the sensors 1004 are capable of detecting non-conductive alignment features (e.g., made of plastic, nylon, etc.). In some examples wherein the sensors 1004 are ultrasonic sensors, the sensors 1004 may measure a gap distance between ones of the sensors 1004 and an object (e.g., the door curtain 104). The controller 114 can then determine whether this gap distance satisfies a threshold range associated with the door curtain 104 being within the guide 110. In some examples, the sensors 1004 are hall sensors (e.g., reed switches), and one or more of the alignment features 118 include magnetic material. For example, FIG. 10C illustrates an example alternate design of an alignment feature 118*c* with a portion of the alignment feature 118*c* including magnetic material to be detected by the hall sensor(s). In some examples, only a bottom one of the alignment features 118*c* includes the magnetic material, as the bottom edge of the door curtain 104 will necessarily be removed from the guide 110 during any transition to the breakaway state. In some examples, the door curtain 104 may include magnetic material independent of the alignment features 118 that is detected by a hall sensor.

In some examples, one or more of the sensors 1004 may be installed in and/or connected to the refeed block 124*a*. In some such examples, the one or more sensors 1004 are microelectromechanical systems (MEMS) magnetometer sensors to detect ferrous materials embedded in the alignment features 118 and/or at other locations on the door curtain 104. In some such examples, the MEMS magnetometer sensors can determine a position of one or more locations of the ferrous materials based on the magnetic field strength in three axes, which can be used to determine whether the locations of the ferrous materials are outside of the guide 110. In some examples, if the sensors 1004 include one or more MEMS magnetometer sensors, the sensors 1004 may detect when a vehicle passes through the doorway 112. The one or more sensors 1004 of the door 1002 communicate signals indicating a presence of one or more of the alignment features 118 or other locations containing ferrous materials (and therefore a presence of the door curtain 104) to enable the controller 114 to analyze transitions to the breakaway state ("breakaway events") and implement corrective actions to address a cause of the transitions to the breakaway state.

Figure 11A:
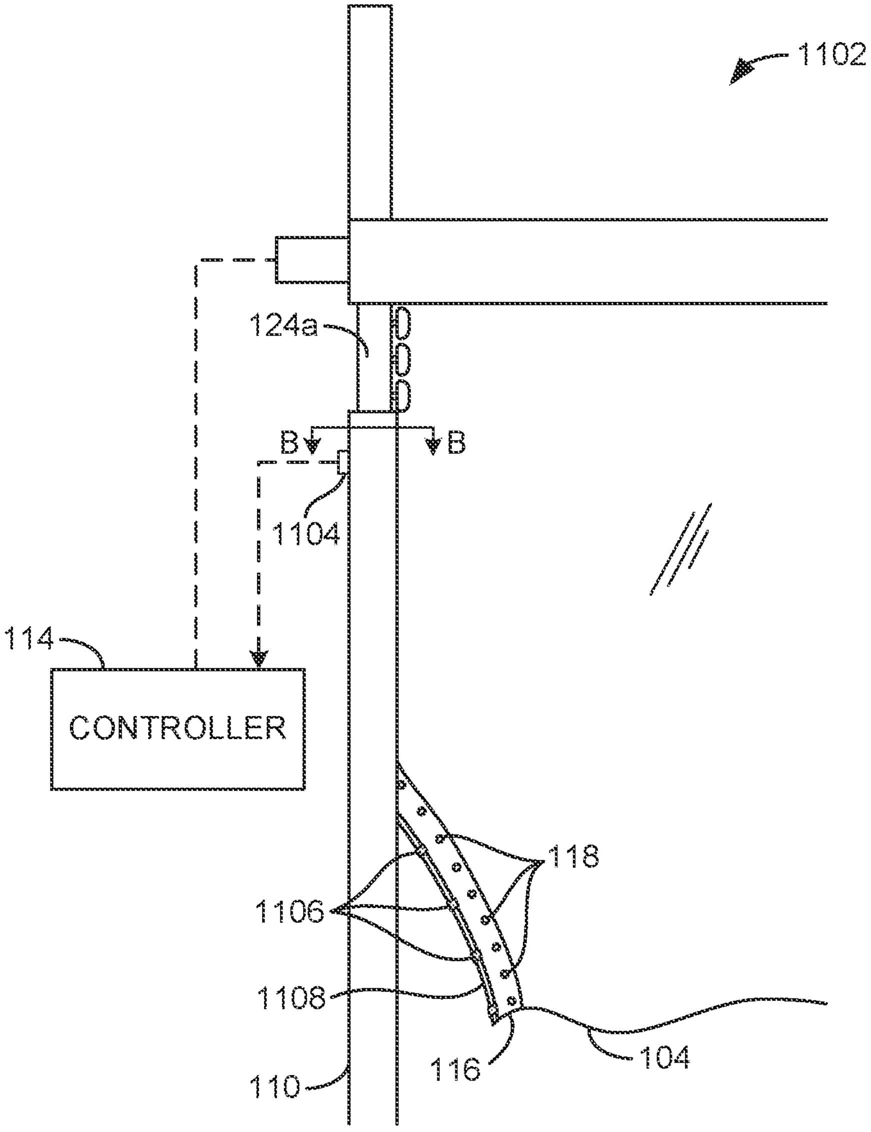
FIG. 11A is a partial view of an example door similar to the example door of FIG. 10A but including a sixth example door curtain breakaway detection system.

FIG. 11A is a partial view of an example door 1102 similar to the example door 1002 of FIG. 10A but including a sixth example door curtain breakaway detection system. Unlike the illustrated example of FIG. 10A, the sixth example door curtain breakaway detection system shown in FIG. 11A includes one or more example sensors 1104 mounted along the guide 110 to detect one or more metal features 1106 coupled to the outermost edge 1108 of lateral edge 116 of the door curtain 104. In the illustrated example, the metal features 1106 are spaced twice as far apart as the alignment features 118. However, in other examples, the metal features 1106 may be spaced farther or closer apart than shown in FIG. 11A. In some examples, only one metal feature 1106 is provided along the entire length of the door curtain 104 near the bottom edge as the most likely location to be removed from the guide 110 during a breakaway as shown in the illustrated example. In some examples, as detailed in FIG. 11B, the metal feature 1106 is a clip or other similarly shaped element that extends around the outermost edge 1108 of the door curtain to interface with the front and back surfaces of the door curtain 104. In other examples, the metal feature 1106 is affixed (e.g., via an adhesive or other attachment means) only to the outermost edge 1108 of the door curtain 104. In other examples, the metal feature may be embedded within the door curtain 104 so as not to extend beyond the outermost edge 1108 of the door curtain 104.

Figure 11B:
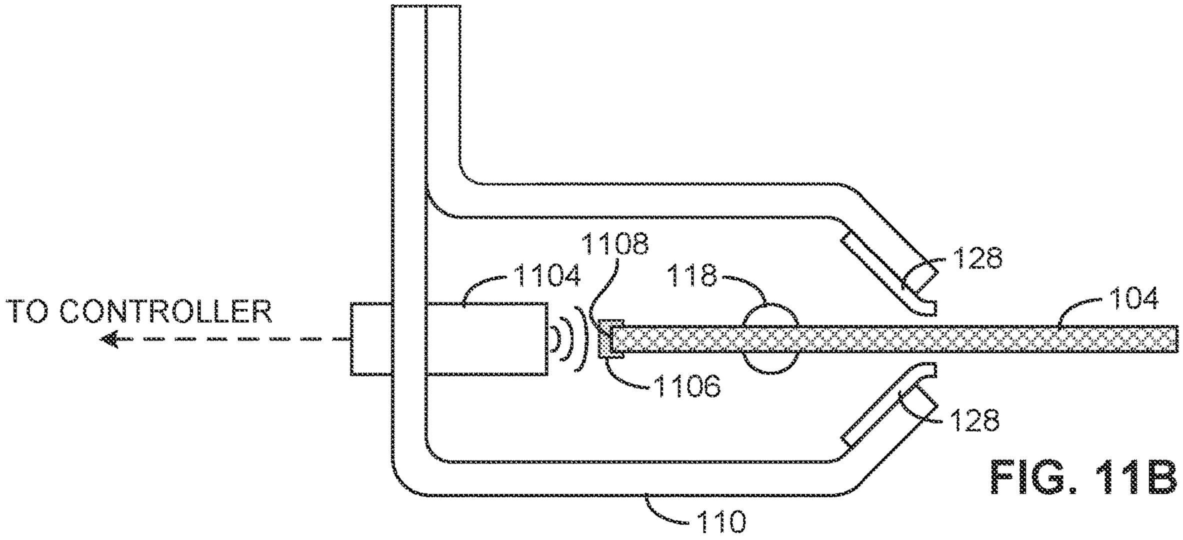
FIG. 11B is a cross-sectional view taken along line B-B of FIG. 11A.

In the illustrated example, only one sensor 1104 is shown positioned near the top of the guide 110. However, in other examples, multiple sensors 110 may be position at different heights along the guide 110 (e.g., similar to the sensors 1004 shown in FIG. 10A). As shown more clearly in the cross-sectional view of FIG. 11B, the sensor 1104 is attached to the back wall of the guide opposite the opening through which the door curtain 104 extends during normal operation and where the retention strips 128 are located. In some examples, the sensor 1104 is an inductive proximity sensor. The example sensor 1104 of FIG. 11 is positioned so as to detect when a metal feature 1106 is in proximity to (e.g., passes by) the sensor 1104. When the sensor 1104 detects the metal feature 1106, the sensor 1104 generates and transmits a signal to the controller 114. Thus, the controller 114 can detect a breakaway event based on the absence of detection of ones of the metal features 1106 as the door curtain 104 moves to the open position because the metal feature 1106 will be outside of the guide 110 and out of detection range of the sensor 1104.

Figure 11C:
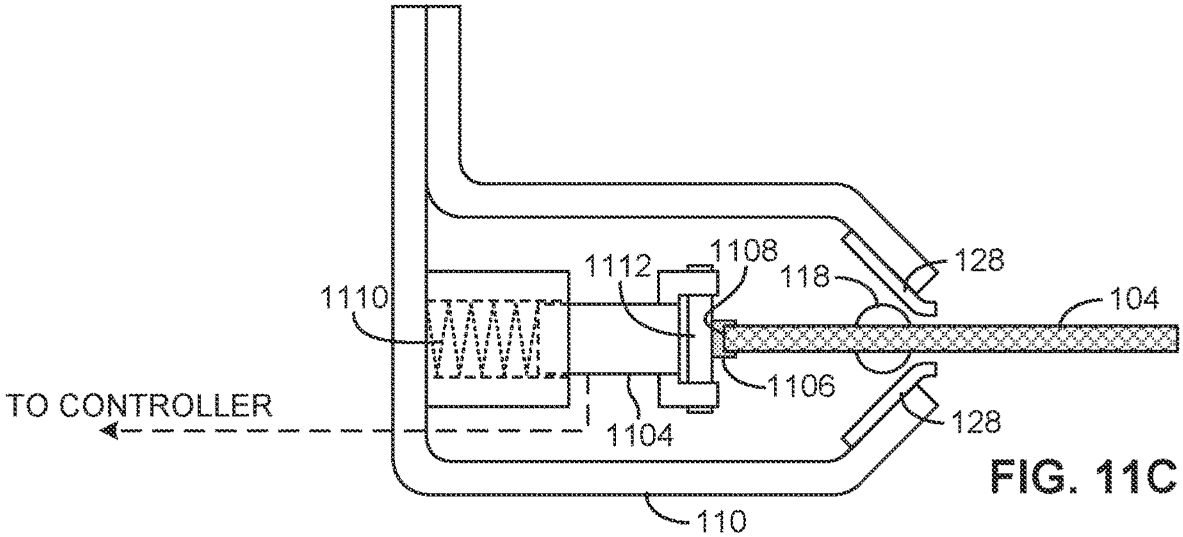
FIG. 11C is an alternative example door curtain breakaway detection system similar to FIG. 11B, but with a moveable sensor.

FIG. 11C is an alternative example door curtain breakaway detection system similar to FIG. 11B, but with a sensor 1104 that is moveable. More particularly, in some examples, the sensor 1104 is coupled to a biasing element 1110 (e.g., a spring) that urges the sensor 1104 towards the door curtain 104. In some examples, the sensor 1104 is part of an assembly that directly engages the outermost edge 1108 of the door curtain 104 and/or the metal feature(s) 1106 on the door curtain 104. In some such examples, the sensor assembly includes a low friction surface and/or a roller 1112 (as shown in FIG. 11C) to reduce wear caused by the contact between the door curtain 104 and the sensor assembly. Enabling movement of the sensor 1104 relative to the guide 110 as shown in the illustrated example of FIG. 11C enables the sensor 1104 to be closer to the metal features 1106 and, thus, smaller in size and/or with a shorter detection range than may be possible for the fixed-position sensor 1104 shown in FIG. 11B. Furthermore, the moving sensor 1104 of FIG. 11C enables the sensor to move with movement of the door curtain 104. For instance, the alignment features 118 on the door curtain 104 may be urged towards the retention strips 128 due to the force of wind on the door curtain 104. While such forces may be insufficient to cause a breakaway event, such forces may nevertheless pull the outermost edge 1108 of the door curtain 104 away from the sensor 1104 of FIG. 11B. However, due to the biasing element 1110 in FIG. 11C, the sensor 1104 in FIG. 11C moves with the door curtain 104 to maintain a relatively consistent distance from the outermost edge 1108 of the door curtain 104 so as to detect the metal feature 1106 as it passes during an opening operation of the door.

The particular cross-sectional shape of the guide 110 shown in FIGS. 11B and 11C is provided for purposes of illustration only. Likewise, the cross-sectional shape of the guide 110 shown in FIG. 4, which is different than the cross-sectional shape shown in FIGS. 11B and 11C, is also provided for purposes of illustration only. More generally, the guide 110 may be constructed with any suitable cross-sectional shape. Likewise, the retention strips 128 may have any suitable shape in accordance with the shape of the guide 110 and/or the shape (e.g., thickness of the door curtain 104).

Figure 12:
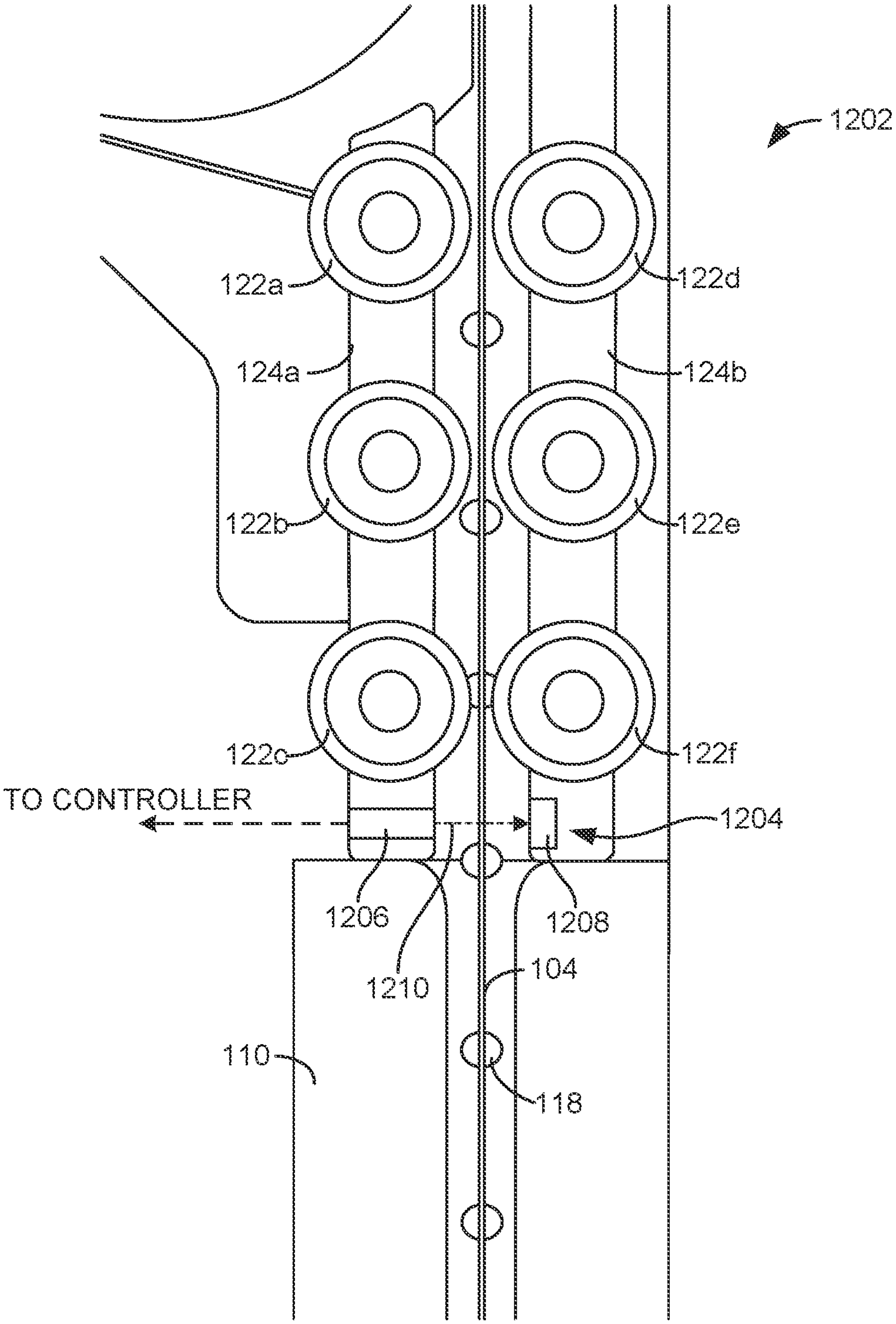
FIG. 12 is a partial view of an example door similar to the example door of FIG. 5 but including a seventh example door curtain breakaway detection system.

FIG. 12 is a partial view of an example door 1202 similar to the example door 102 of FIG. 1 as detailed in FIG. 5 but including a seventh example door curtain breakaway detection system. In the illustrated example, a photoelectric sensor 1204 including first and second portions 1206, 1208 is positioned within the refeed blocks 124_a_, 124_b_ below the refeed rollers 122. More particularly, in some examples, the first and second portions 1206, 1208 of the photoelectric sensor 1204 are positioned to transmit a beam of light 1210 (e.g., infrared light, visible light, ultraviolet light, etc.) across the path of the door curtain 104 during normal operations. In the illustrated example, photoelectric sensor 1204 is a retro-reflective photo-eye in which the first portion 1206 both generates the beam of light 1210 and detects the beam of light after it is reflected off the second portion 1208 corresponding to any suitable reflective surface. When the beam of light 1210 is detected by the first portion 1206, a signal is generated and provided to the controller 114. In other examples, either one of the portions 1206, 1208 of the photoelectric sensor 1204 generates the beam of light 1210 and the other portion 1206, 1208 detects the beam of light and provides an associated signal to the controller 114. In some examples, the door curtain 104 includes and/or carries a reflective surface along the lateral edge 116 to serve as the second portion 1208 when the first portion 1206 corresponds to a retro-reflective photo-eye. In some such examples, the reflective surface on the door curtain 104 is positioned along the lateral edge 116 at a location that aligns with the retro-reflective photo-eye when the door curtain 104 is in the normal operational state within the guide 110. In such examples, the first portion 1206 detects the beam of light 1210 when the door curtain 104 is in the normal operational state and generates a signal (indicative of a breakaway state) that is provided to the controller 114 when the beam of light 1210 is not detected.

During normal operations, the door curtain 104 will block the path of the beam of light 1210 between the first and second portions 1206, 1208 of the photoelectric sensor 1204 such that no signal will be generated or output to the controller 114. However, during a breakaway event when at least a portion of the lateral edge 116 of the door curtain 104 has been forcibly removed from the guide 110, the door curtain 104 will not block the beam of light 1210, thereby enabling the controller 114 to detect the breakaway event. In some examples, the first and second portions 1206, 1208 of the photoelectric sensor 1204 are positioned within the guide 110, near the top and just below the refeed blocks 124*a*, 124*b*. Further, in some examples, multiple photoelectric sensors 1204 may be positioned at different locations along the guide 110.

Figure 13:
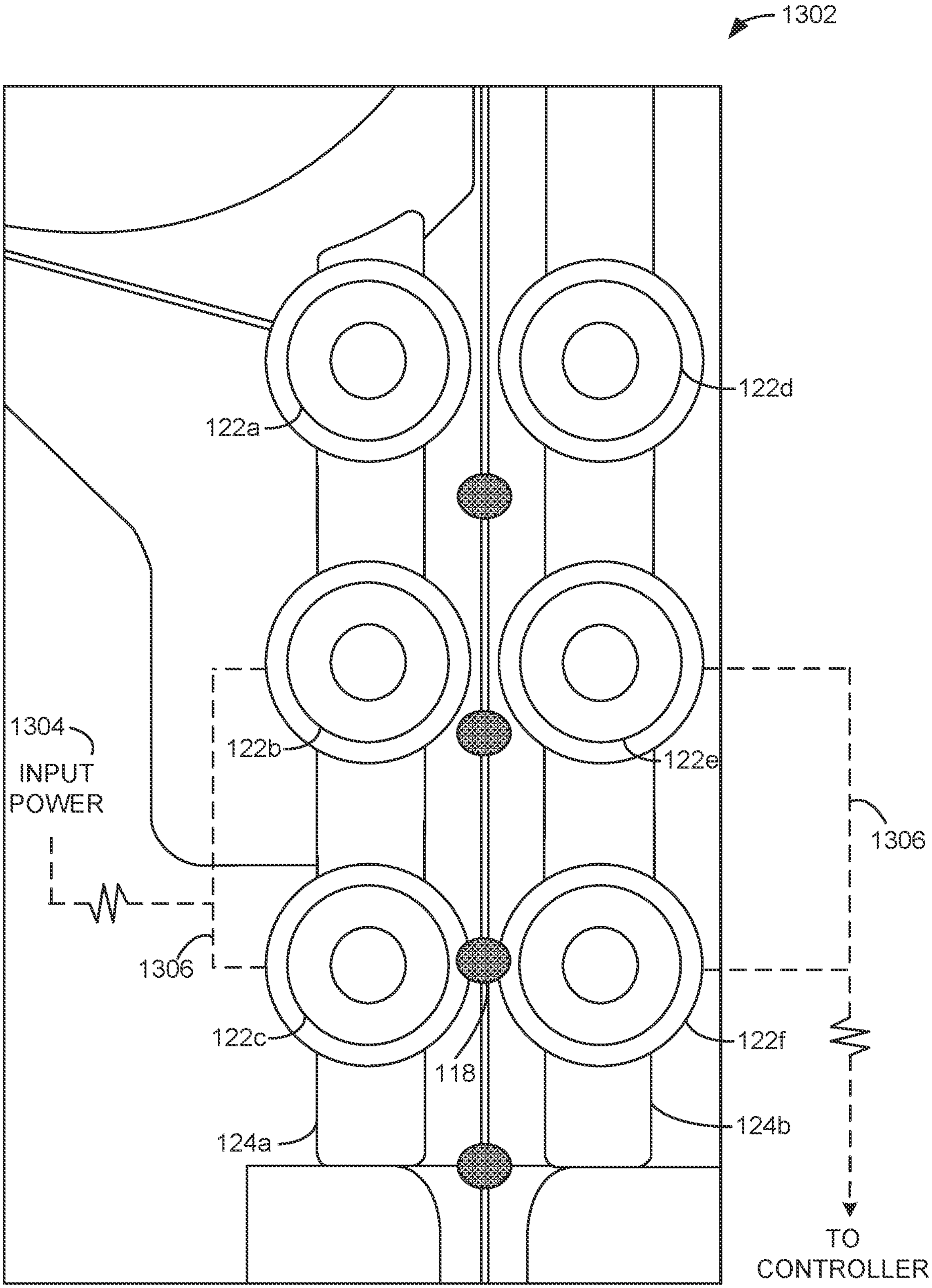
FIG. 13 is a view of an example refeed roller assembly similar to the refeed roller assembly of FIG. 5, but including an eighth example door curtain breakaway detection system with an example door curtain illustrated in a breakaway position.

FIG. 13 is a view of an example refeed roller assembly 1302 similar to the refeed roller assembly 120 of FIG. 5, but including an eighth example door curtain breakaway detection system with the door curtain 104 illustrated in the breakaway state. The door curtain 104 is illustrated in the breakaway state as indicated by one of the alignment features 118 being in front of the lower pair of refeed rollers 122*c*, 122*f*, indicating the lateral edge of the door curtain 104 is not in alignment with the guide 110 at the vertical position of the lower pair of refeed rollers 122*c*, 122*f*.

In the eighth door curtain breakaway detection system, both the alignment features 118 and the refeed rollers 122 are electrically conductive. The eighth door curtain breakaway detection system includes an example input power source 1304 and an example electrical circuit 1306 to connect the input power source 1304 to the controller via a pair of the refeed rollers 122 when one of the alignment features 118 engages the refeed rollers 122, thereby closing the electrical circuit. For example, in the illustrated example of FIG. 13, a refeed operation is occurring, whereby one of the alignment features 118 is contacting the refeed rollers 122*c*, 122*f*. As a result, an electric signal flows from the input power source 1304 through the electrical circuit via the refeed rollers 122*c*, 122*f* and the alignment features 118 contacting the refeed rollers 122*c*, 122*f*, ultimately arriving at the controller 114. When the controller 114 receives a signal from the electrical circuit 1306, the controller 114 can determine that a refeed operation occurred (and therefore, the door curtain 104 was previously in the breakaway state). In some examples, all of the alignment features 118 are electrically conductive. In some examples, only one or a relatively few quantity (e.g., two, three) of the alignment features 118 toward the bottom of the door curtain 104 are electrically conductive, as these features will likely be involved in the refeed operation if the door curtain 104 is in a breakaway state. Further, while the second pair of refeed rollers 122*b*, 122*e* and the third pair of refeed rollers 122*c*, 122*f* are connected to the electrical circuit 1306 in the illustrated example, any one or more pairs of the refeed rollers 122 may be connected to the electrical circuit 1306.

In some examples, the input power source 1304 is a direct current (DC) power source. In some examples, the input power source 1304 is an alternating current (AC) power source and utilizes an AC/DC converter. In the illustrated example, the electrical circuit 1306 includes one or more resistors in order to prevent a current overload when one of the alignment features 118 closes the circuit.

Although each of the different example door curtain breakaway detection system discussed in connection with FIGS. 6-13 have been described individually, in some examples, more than one of the detection systems and/or particular aspects of different ones of the detection systems may be combined in any suitable manner for redundancy and/or to provide more robust and/or accurate detection of breakaway events.

Figure 14:
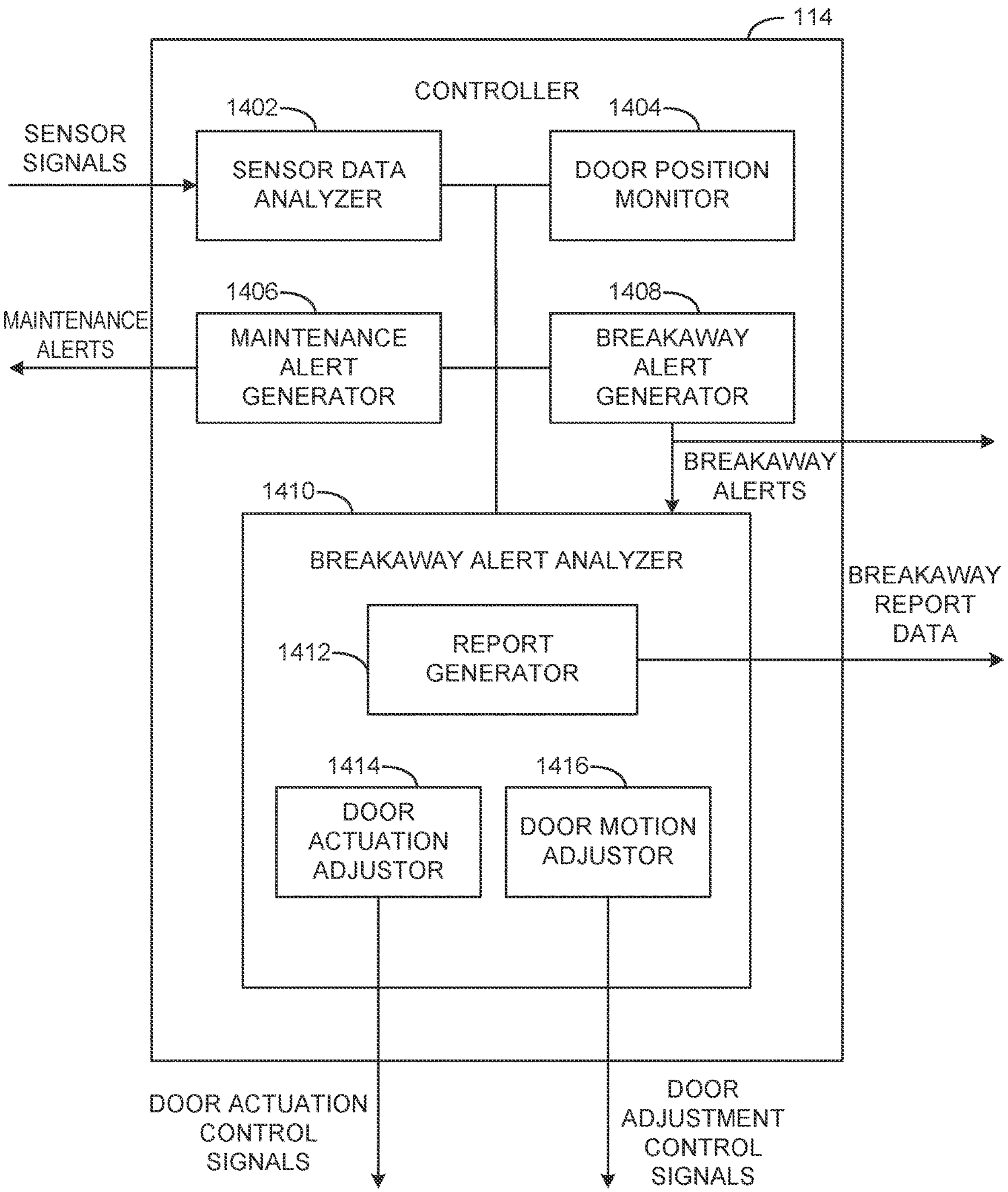
FIG. 14 is a block diagram illustrating an example implementation of any one of the example controllers of FIGS. 1, 6, and/or 10A.

FIG. 14 is a block diagram illustrating an example implementation of the controller 114 of FIGS. 1, 6, 10A, and 11A. The example controller 114 includes an example sensor data analyzer 1402, an example door position monitor 1404, an example maintenance alert generator 1406, an example breakaway alert generator 1408, an example breakaway alert analyzer 1410, an example report generator 1412, an example door actuation adjustor 1414, and an example door motion adjustor 1416.

The example sensor data analyzer 1402 of the illustrated example of FIG. 14 analyzes sensor data from one or more of the scanners 606 of FIG. 6, the switches 704 of FIG. 7, the switches 808 of FIG. 8, the sensors 904 of FIG. 9, the sensors 1004 of FIG. 10A, the sensor 1104 of FIG. 11A, the photoelectric sensor 1204 of FIG. 12, and/or the electrical circuit 1306 of FIG. 13. In some examples, the sensor data analyzer 1402 of the illustrated example interprets the sensor signals to determine whether the door curtain 104 was present at a location adjacent one of the sensing devices and/or whether a refeed operation occurred. In some examples, this analysis can be the basis to infer or determine that a breakaway event has occurred.

The sensor data analyzer 1402 of the illustrated example determines a refeed operation occurred in response to a change in signal (e.g., from a "0" to "1" if the signal is a binary signal, from a "1" to a "0," etc.) from one or more of the switches 704 of FIG. 7, the switches 808 of FIG. 8, and/or the electrical circuit 1306 of FIG. 13. In some such examples, the sensor data analyzer 1402 communicates the detected occurrence of a refeed operation to the breakaway alert generator 1408 to cause a breakaway alert to be generated, since a breakaway state precedes a refeed operation.

In some examples, data from the sensor data analyzer 1402 is unable to independently indicate whether a breakaway event occurred. In some such examples, the breakaway alert generator 1408 determines whether a breakaway event occurred based on analysis from the sensor data analyzer 1402 and data from the door position monitor 1404. For example, the sensor data analyzer 1402 of the illustrated example communicates data indicating whether or not one or more of the scanners 606 detected the tags 604 to the breakaway alert generator 1408, which determines whether a breakaway state occurred based on the data indicating whether the tags 604 were detected and a position of the door curtain 104 from the door position monitor 1404. In some examples, the sensor data analyzer 1402 additionally communicates location data and/or other data decoded based on the tags 604. Similarly, the sensor data analyzer 1402 of the illustrated example communicates data indicating a status of one or more of the switches 808 of FIG. 8. In some examples, the sensor data analyzer 1402 communicates the statuses of the switches 808 to the breakaway alert generator 1408, to be used in conjunction with data from the door position monitor 1404 to determine whether the door curtain 104 was in a breakaway state. Additionally, the sensor data analyzer 1402 of the illustrated example analyzes data from the sensors 1004, 1104, 1204 of FIG. 10-12 to determine whether the door curtain 104 was present within the guide 110 at the locations of the sensors. This determination is communicated to the breakaway alert generator 1408, which determines whether or not the door curtain 104 was in a breakaway state based on this determination and data from the door position monitor 1404.

The sensor data analyzer 1402 of the illustrated example analyzes data from the sensor 904 of FIG. 9 to determine whether a refeed operation occurred. In some examples, the sensor data analyzer 1402 compares data from the sensor 904 to data from a similar sensor (e.g., such as the additional sensor 906) positioned on another part of the door 102. For example, if another sensor of the same type (e.g., a second accelerometer, if the sensor 904 is an accelerometer) positioned on another component of the door 102 has similar data (e.g., similar acceleration data, similar forces, similar motion, etc.) then it is unlikely that a refeed operation occurred. Conversely, the sensor data analyzer 1402 may determine a refeed operation occurred when the data from the sensor 904 has unique characteristics relative to another sensor mounted to the door 102. In some examples, the sensor data analyzer 1402 is trained to recognize characteristics of a refeed operation in data from the sensor 904. In some such examples, machine learning is utilized to train the sensor data analyzer 1402 to recognize characteristics of a refeed operation.

The door position monitor 1404 of the illustrated example of FIG. 14 determines a position of the door curtain 104. For example, the door position monitor 1404 of the illustrated example may determine a vertical position of the door curtain 104 (e.g., a position of the bottom edge 105 of the door curtain 104) between fully open and fully closed positions based on a position and/or output of a motor or other element driving the door curtain 104. In some examples, the controller 114 determines a position of the door curtain 104 based on data from another component of the controller 114 which issues control commands to adjust a position of the door curtain 104. The door position monitor 1404 communicates positional data for the door curtain 104 to the maintenance alert generator 1406, the breakaway alert generator 1408, and/or the breakaway alert analyzer 1410.

The maintenance alert generator 1406 of the illustrated example of FIG. 14 generates maintenance alerts corresponding to potential maintenance problems identified based on data from the sensor data analyzer 1402. The maintenance alert generator 1406 of the illustrated example issues a maintenance alert if data from the scanners 606 indicates that a small quantity (e.g., not satisfying a threshold quantity to indicate a possible breakaway state) of the tags 604 were not detected when they were expected to be detected (e.g., when the door position monitor 1404 indicates the door curtain 104 was covering the vertical position of the scanner). Similarly, the maintenance alert generator 1406 of the illustrated example may issue a maintenance alert if one or more of the sensors 1004 of FIG. 10A do not detect the alignment features 118 when they were expected to be detected, assuming it has been determined that the door curtain 104 was not in the breakaway state. Likewise, the maintenance alert generator 1406 may issue a maintenance alert if one or more of the sensors 1104 of FIG. 11A do not detect the metal features 1106 when they were expected to be detected. In some examples, the maintenance alert generator 1406 communicates with the breakaway alert generator 1408 to ensure maintenance alerts are not generated when the door curtain 104 has moved to the breakaway state. In some examples, if the breakaway alert generator 1408 repeatedly detects that the door curtain 104 is in a breakaway state (e.g., by detecting the door curtain 104 is in the breakaway state more than a threshold number of times in a time period), the maintenance alert generator 1406 may issue a maintenance alert to correct a non-restorable breakaway state, wherein the refeed roller assemblies 120 may not be able to restore the door curtain 104 to the operational state.

The breakaway alert generator 1408 of the illustrated example of FIG. 14 generates breakaway alerts in response to determining, based on data from the sensor data analyzer 1402 and the door position monitor 1404, that the door curtain 104 is currently in, or was previously in, the breakaway state. For example, if the door position monitor 1404 indicates that the door curtain 104 was at a position of a sensor, switch and/or scanner when data from the sensor, switch and/or scanner indicated the door curtain 104 was not present (e.g., as determined by the sensor data analyzer 1402), the breakaway alert generator 1408 of the illustrated example generates a breakaway alert. In some examples, the breakaway alert generator 1408 communicates the breakaway alert to an operator via a display on or around the controller 114. In some examples, the breakaway alert generator 1408 communicates the breakaway alert to the breakaway alert analyzer 1410 for further analysis to determine characteristics of the breakaway event, potential corrective actions that can be taken to reduce the likelihood of similar breakaway events, and/or to generate reports pertaining to breakaway events. In some examples, in response to the door position monitor 1404 indicating that the door curtain 104 was not at a position of the sensor, switch and/or scanner that indicated the door curtain 104 was not present (e.g., the door curtain 104 was higher than the switch, sensor, and/or scanner), the breakaway alert generator 1408 determines that there is no indication the door curtain 104 is in the breakaway state, and no breakaway alert needs to be generated.

The example breakaway alert analyzer 1410 of the illustrated example of FIG. 14 generates reports associated with the breakaway alerts generated by the breakaway alert generator 1408 and/or causes adjustments to aspects of the door 102 based on the breakaway alerts. In the illustrated example, the breakaway alert analyzer 1410 includes an example report generator 1412, an example door actuation adjustor 1414, and an example door motion adjustor 1416.

The example report generator 1412 of the illustrated example of FIG. 14 generates reports based on breakaway alert data from the breakaway alert generator 1408 and/or maintenance alert data from the maintenance alert generator 1406. In some examples, the report generator 1412 additionally or alternatively generates reports based on data from the sensor data analyzer 1402 and/or the door position monitor 1404. For example, the report generator 1412 can analyze breakaway alerts, maintenance alerts, sensor data, and/or door position data and determine patterns associated with breakaway events and/or maintenance problems. In some such examples, the report generator 1412 generates reports describing these patterns. In such examples, the report generator 1412 determines corrective actions which may be taken to address potential causes of the breakaway alerts and/or maintenance alerts and includes such corrective actions in a report.

The report generator 1412 of the illustrated example can communicate reports on breakaway events and/or maintenance alerts to a display on the controller 114 and/or a display otherwise accessible to an operator. In some examples, the report generator 1412 communicates reports to a central computing system (e.g., a computing system which receives data from a plurality of doors, a computing system which is remote from the door, etc.).

The door actuation adjustor 1414 of the illustrated example of FIG. 14 issues door actuation control signals to adjust parameters associated with door actuation sensors and/or a door actuation component of the controller 114 to address a potential cause of door breakaway events. In some examples, the door 102 includes one or more sensors which detect persons and/or vehicle approaching the doorway 112. In some such examples, the one or more sensors communicate to the controller 114 to cause the door curtain 104 to raise to allow the person and/or vehicle to move through the doorway 112. In some examples, the door actuation adjustor 1414 issues door actuation control signals to adjust a position (e.g., an angle of rotation) of a sensor that is to cause the door curtain 104 to raise to allow the person and/or vehicle to move through the doorway 112. In some examples, the door actuation adjustor 1414 adjusts a parameter on the controller 114 to adjust a timing of door actuation. For example, if breakaway is frequently occurring because the person and/or vehicle passing through the doorway is impacting the door curtain 104 as the curtain moves upward, the door actuation adjustor 1414 can reduce a delay between detection of the person and/or vehicle by the sensor and actuation of the door curtain 104. Conversely, if the door curtain 104 is impacted by a person and/or vehicle while moving downward toward the closed position, the door curtain 104 may be opening too early and then closing before the person and/or vehicle is able to completely clear the doorway 112. The door actuation adjustor 1414 may make any other adjustments to sensors that result in actuation of the door curtain 104, and/or to the way the controller 114 responds to data from these sensors, to address a potential cause of breakaway events. In some examples, the door actuation adjustor 1414 implements adjustments to parameters pertaining to door actuation based on patterns analyzed by the report generator 1412 and/or recommendations generated by the report generator 1412.

The example door motion adjustor 1416 issues door adjustment control signals to adjust parameters associated with opening and closing of the door curtain 104. For example, the door motion adjustor 1416 can slow down or speed up the rate at which the door curtain 104 opens to address a potential cause of breakaway events. In some examples, the door motion adjustor 1416 adjusts a duration that the door curtain 104 remains open. For example, if the report generator 1412 analyzes the breakaway alert data from the breakaway alert generator 1408 and determines that the door is frequently transitioning to the breakaway state when two consecutive people and/or vehicles pass through the doorway 112, the door motion adjustor 1416 can issue door adjustment control signals to command the door curtain 104 to remain open for a longer duration such that two or more persons and/or vehicles can pass through before the door curtain 104 begins to close. In some examples, the door motion adjustor 1416 implements adjustments to parameters pertaining to door motion based on patterns analyzed by the report generator 1412 and/or recommendations generated by the report generator 1412.

In some examples, the door motion adjustor 1416 causes the door curtain 104 to move to a fully open position when a breakaway is detected and the door curtain 104 is configured to open to a partially-open state. For example, since the refeed roller assemblies 120 are located near a top end of the door curtain 104, the door motion adjustor 1416 can cause the door curtain 104 to fully retract when a breakaway is detected, even if the door curtain 104 is configured to only open to a partially-open position. In some examples, when the door curtain 104 fully retracts, the entirety of the lateral edges of the door curtain 104 pass through the refeed roller assemblies 120, thereby restoring the door curtain 104 to the operational state.

While an example manner of implementing the controller 114 of FIGS. 1, 6, 10A, and 11A is illustrated in FIG. 14, one or more of the elements, processes and/or devices illustrated in FIG. 14 may be combined, divided, re-arranged, omitted, eliminated and/or implemented in any other way. Further, the example sensor data analyzer 1402, the example door position monitor 1404, the example maintenance alert generator 1406, the example breakaway alert generator 1408, the example breakaway alert analyzer 1410, the example report generator 1412, the example door actuation adjustor 1414, the example door motion adjustor 1416 and/or, more generally, the example controller 114 of FIG. 14 may be implemented by hardware, software, firmware and/or any combination of hardware, software and/or firmware. Thus, for example, any of the example sensor data analyzer 1402, the example door position monitor 1404, the example maintenance alert generator 1406, the example breakaway alert generator 1408, the example breakaway alert analyzer 1410, the example report generator 1412, the example door actuation adjustor 1414, the example door motion adjustor 1416 and/or, more generally, the example controller 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor data analyzer 1402, the example door position monitor 1404, the example maintenance alert generator 1406, the example breakaway alert generator 1408, the example breakaway alert analyzer 1410, the example report generator 1412, the example door actuation adjustor 1414, and/or the example door motion adjustor 1416 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 114 of FIGS. 1, 6, 10A, and 11A may include one or more elements, processes and/or devices in addition to, or instead of, those illustrated in FIG. 14, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the controller 114 of FIG. 14 are shown in FIGS. 15-21. The machine readable instructions may be one or more executable programs or portion(s) of an executable program for execution by a computer processor such as the processor 2212 shown in the example processor platform 2200 discussed below in connection with FIG. 22. The program may be embodied in software stored on a non-transitory computer readable storage medium such as a CD-ROM, a floppy disk, a hard drive, a DVD, a Blu-ray disk, or a memory associated with the processor 2212, but the entire program and/or parts thereof could alternatively be executed by a device other than the processor 2212 and/or embodied in firmware or dedicated hardware. Further, although the example programs are described with reference to the flowchart illustrated in FIGS. 15-21, many other methods of implementing the example controller 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 15-21 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 15:
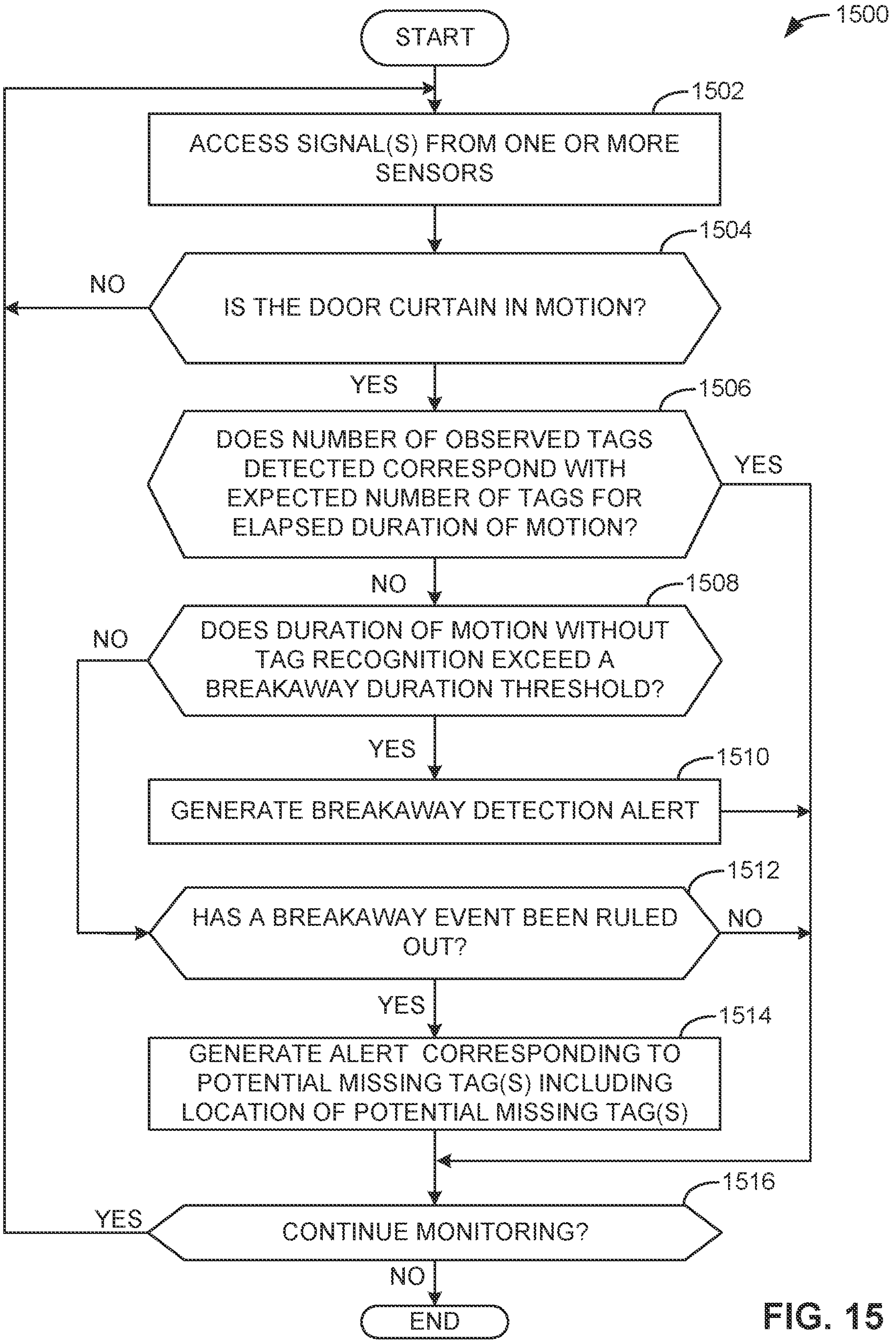
FIG. 15 is a flowchart representative of example machine readable instructions that may be executed to implement the example controller of FIG. 14 to detect a door curtain breakaway event using the first door curtain breakaway detection system of FIG. 6.

Example machine readable instructions 1500 that may be executed by the controller 114 to detect a door curtain breakaway event using the first door curtain breakaway detection system of FIG. 6 are illustrated in FIG. 15. With reference to the preceding figures and associated description, the example machine readable instructions 1500 of FIG. 15 begin with the example controller 114 accessing signal(s) from one or more sensors (block 1502). In some examples, the sensor data analyzer 1402 accesses signal(s) from one or more of the scanners 606.

At block 1506, the example controller 114 determines if the door curtain 104 is in motion. In some examples, the door position monitor 1404 determines whether the door curtain 104 is in motion based on a motor and/or other element driving the door curtain 104. In some examples, the door position monitor 1404 determines whether the door curtain 104 is in motion based on another component of the controller 114 which commands motion of the door curtain 104. In response to the door curtain being in motion, processing transfers to block 1506. Conversely, in response to the door curtain 104 not being in motion, processing returns to block 1502.

At block 1506, the example controller 114 determines if the number of observed tags detected correspond with an expected number of tags for the elapsed duration of motion. In some examples, the breakaway alert generator 1408, based on data from sensor data analyzer 1402 and the door position monitor 1404, determines whether the number of observed ones of the tags 604 detected in data from the scanners 606 correspond with an expected number of the tags 604 for the elapsed duration of motion. In some examples, the breakaway alert generator 1408 determines the expected number of the tags 604 for the elapsed duration based on a speed of the door curtain 104 from the door position monitor 1404, and based on a known spacing between the tags 604. In response to the number of observed tags detected corresponding with the expected number of tags for the elapsed duration of motion, processing transfers to block 1516. Conversely, in response to the number of observed tags detected not corresponding with the expected number of tags for the elapsed duration of motion, processing transfers to block 1508.

At block 1508, the example controller 114 determines if the duration of motion without tag recognition exceeds a breakaway duration threshold. In some examples, the breakaway alert generator 1408 determines if the duration of motion without recognition of the tags 604 exceeds a breakaway duration threshold. In some examples, the breakaway alert generator 1408 alternatively determines if a number of missing ones of the tags 604 exceeds a breakaway tag quantity threshold. The breakaway tag quantity threshold quantifies a minimum number of the tags 604 that would be expected to be removed from the guide 110 during the smallest possible breakaway event (e.g., a breakaway event with the least amount of the door curtain 104 in a breakaway state). In response to the duration of motion without tag recognition exceeding a breakaway duration threshold, processing transfers to block 1510. Conversely, in response to the duration of motion without tag recognition not exceeding a breakaway duration threshold, processing transfers to block 1512.

At block 1510, the example controller 114 generates a breakaway detection alert. In some examples, the breakaway alert generator 1408 generates a breakaway detection alert. For example, the breakaway alert generator 1408 can transmit a signal to visually (e.g., via a display on the controller 114), audibly, or otherwise inform an operator that a breakaway event has occurred. Thereafter, processing transfers to block 1516.

At block 1512, the example controller 114 determines whether a breakaway event has been ruled out. In some examples, the breakaway alert generator 1408 determines whether a breakaway alert has been ruled out by determining whether a time equal to or exceeding the breakaway duration threshold time duration has occurred following the detection of the potential missing tag(s) (e.g., following the time at which the number of observed tags detected did not corresponding with the expected number of tags for the elapsed duration, per Block 1506). In some examples, the potential missing tag(s) may be due to a breakaway event, and the breakaway alert generator 1408 may require more time to determine whether a breakaway event has occurred or potential missing tag(s) have been detected. In response to ruling out a breakaway event, processing transfers to block 1514. Conversely, in response to not ruling out a breakaway event, processing transfers to block 1516.

At block 1514, the example controller 114 generates an alert corresponding to potential missing tag(s) including locations of potential missing tag(s). In some examples, the maintenance alert generator 1406 generates data and/or alerts corresponding to potential missing or malfunctioning ones of the tags 604. In some such examples, the data and/or alerts include location(s) (e.g., vertical distances on the door curtain 104) of the potentially missing or malfunctioning tags.

At block 1516, the example controller 114 determines whether to continue monitoring. In response to continuing monitoring, processing transfers to block 1502. Conversely, in response to not continuing monitoring, processing terminates.

Figure 16:
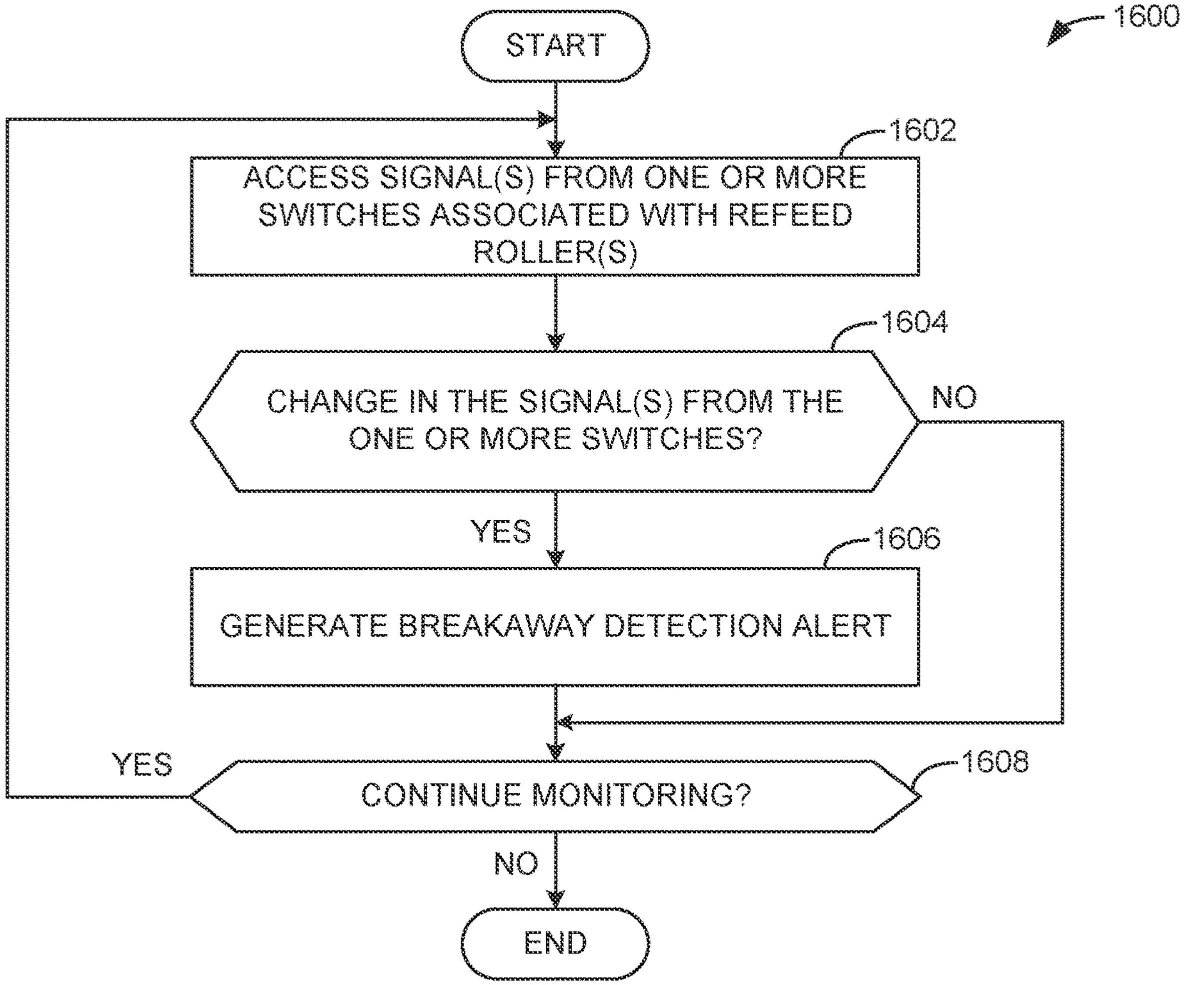
FIG. 16 is a flowchart representative of example machine readable instructions that may be executed to implement the example controller of FIG. 14 to detect a door curtain breakaway event using the second door curtain breakaway detection system of FIGS. 7A and/or 7B.

Example machine readable instructions 1600 that may be executed by the controller 114 to detect a door curtain breakaway event using the second door curtain breakaway detection system of FIGS. 7A and/or 7B are illustrated in FIG. 16. With reference to the preceding figures and associated description, the example machine readable instructions 1600 of FIG. 16 begin with the example controller 114 accessing signal(s) from one or more switches associated with refeed roller(s) (block 1602). In some examples, the sensor data analyzer 1402 accesses signal(s) from one or more of the switches 704 of FIGS. 7A and/or 7B associated with the refeed rollers 122.

At block 1604, the example controller 114 determines whether there has been a change in the signal(s) from the one or more switches. In some examples, the sensor data analyzer 1402 determines whether there has been a change in the signal(s) from one or more of the switches 704. In response to detecting a change in one or more signal(s) from one or more of the switches 704, processing transfers to block 1606. Conversely, in response to not detecting a change in the one or more signal(s) from one or more of the switches 704, processing transfers to block 1608.

At block 1606, the example controller 114 generates a breakaway detection alert. In some examples, the breakaway alert generator 1408 generates a breakaway detection alert. The breakaway detection alert may be an audible alert, a visual alert (e.g. communicated via a display of the controller 114, communicated via a display of a central computing device, etc.), or any other form of alert.

At block 1608, the example controller 114 determines whether to continue monitoring. In response to continuing monitoring, processing transfers to block 1602. Conversely, in response to not continuing monitoring, processing terminates.

Figure 17:
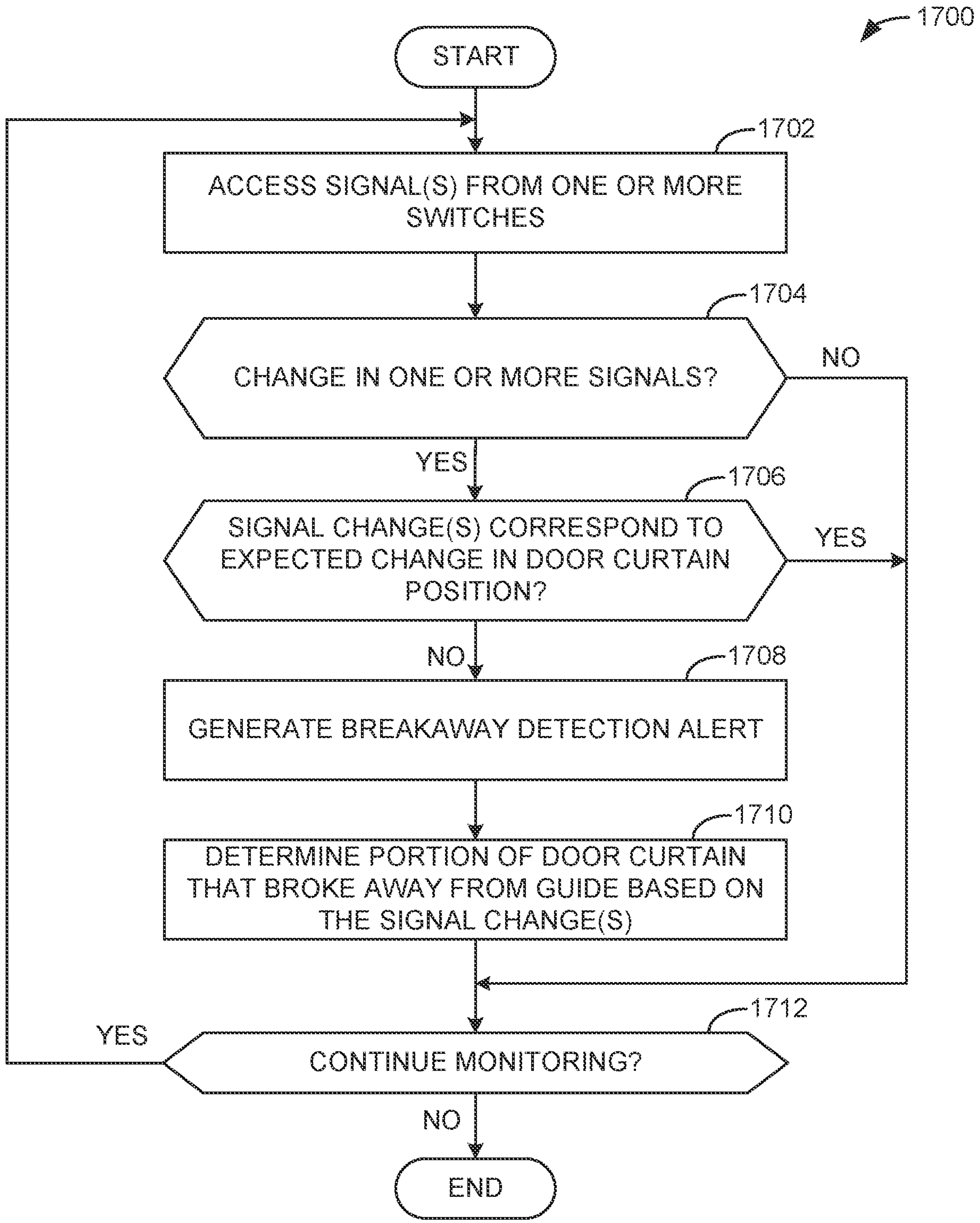
FIG. 17 is a flowchart representative of example machine readable instructions that may be executed to implement the example controller of FIG. 14 to detect a door curtain breakaway event using the third door curtain breakaway detection system of FIG. 8.

Example machine readable instructions 1700 that may be executed by the controller 114 to detect a door curtain breakaway event using the third door curtain breakaway detection system of FIG. 8 are illustrated in FIG. 17. With reference to the preceding figures and associated description, the example machine readable instructions 1700 of FIG. 17 begin with the example controller 114 accessing signals from one or more of the switches (block 1702). In some examples, the sensor data analyzer 1402 accesses signal(s) from one or more of the switches 808 of FIG. 8.

At block 1704, the example controller 114 determines whether there has been a change in one or more of the signals. In some examples, the sensor data analyzer 1402 determines whether there has been a change in one or more of the signals from the switches 808. In response to there being a change in one or more of the signals, processing transfers to block 1706. Conversely, in response to there not being a change in one or more of the signals, processing transfers to block 1712.

At block 1706, the example controller 114 determines whether the signal change(s) correspond to an expected change in door curtain position. In some examples, the breakaway alert generator 1408 determines whether the signal change(s) correspond to an expected change in a position of the door curtain 104 based on data from the door position monitor 1404. For example, if the sensor data analyzer 1402 determines based on a signal from a particular one of the switches 808 that the door curtain 104 is no longer detected adjacent the one of the switches 808, the breakaway alert generator 1408 can determine if this is expected based on whether the door curtain 104 moved to a position above the particular switch 808 (and is therefore not expected to be adjacent the particular switch 808). In response to the signal change(s) corresponding to an expected change in door curtain position, processing transfers to block 1712. Conversely, in response to the signal change(s) not corresponding to an expected change in the door curtain position, processing transfers to block 1708.

At block 1708, the example controller 114 generates a breakaway detection alert. In some examples, the breakaway alert generator 1408 generates a breakaway detection alert.

At block 1710, the example controller 114 determines a portion of the door curtain 104 which broke away from the guide 110 based on the signal change(s). In some examples, the breakaway alert generator 1408 determines a portion of the door which broke away from the guide 110 based on a known position of the door curtain 104 and a knowledge of the location of the switch(es) which detected the signal change. For example, the breakaway alert generator 1408 can determine that the entirety of the door curtain 104 which is located below the switch which detected the signal change (that was subsequently determined to be due to the door curtain 104 being in a breakaway state) is in the breakaway state.

At block 1712, the example controller 114 determines whether to continue monitoring. In response to continuing monitoring, processing transfers to block 1702. Conversely, in response to not continuing monitoring, processing terminates.

Figure 18:
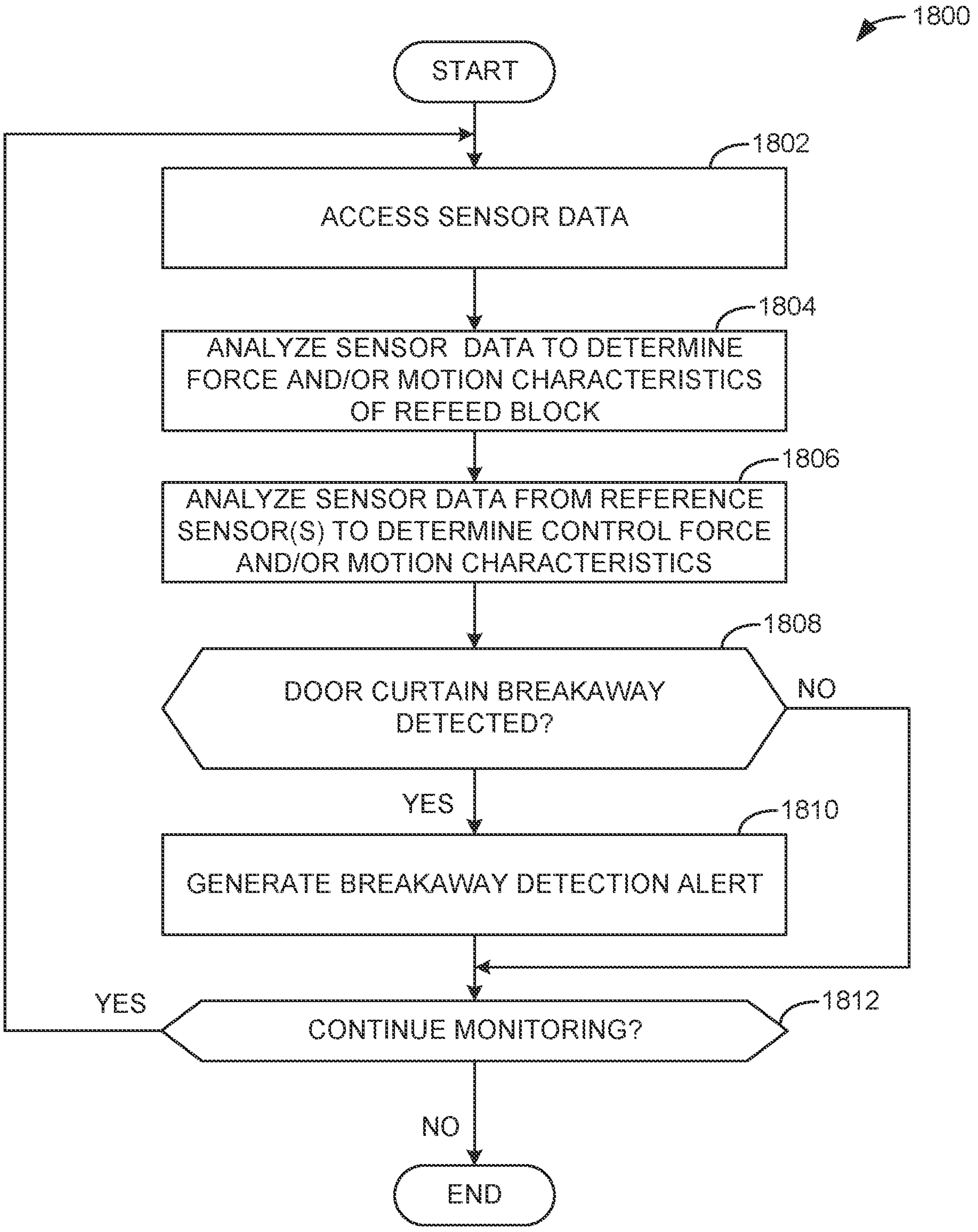
FIG. 18 is a flowchart representative of example machine readable instructions that may be executed to implement the example controller of FIG. 14 to detect a door curtain breakaway event using the fourth door curtain breakaway detection system of FIG. 9.

Example machine readable instructions 1800 that may be executed by the controller 114 to detect a door curtain breakaway event using the fourth door curtain breakaway detection system of FIG. 9 are illustrated in FIG. 18. With reference to the preceding figures and associated description, the example machine readable instructions 1800 of FIG. 18 begin with the example controller 114 accessing sensor data (block 1802). In some examples, the sensor data analyzer 1402 accesses sensor data from the sensor 904 of FIG. 9.

At block 1804, the example controller 114 analyzes sensor data to determine force and/or motion characteristics of the refeed block. In some examples, the sensor data analyzer 1402 analyzes data from the sensor 904 to determine force and/or motion characteristics of the refeed block 124*a*. In some examples, the sensor data analyzer 1402 determines velocity and/or acceleration characteristics of the refeed block 124*a*.

At block 1806, the example controller 114 analyzes sensor data from one or more additional sensor(s) 906 to determine control force and/or motion characteristics. In some examples, the sensor data analyzer 1402 analyzes sensor data from one or more additional sensor(s) 906 mounted to another portion of the door 100 (e.g., not mounted to the refeed assembly 120), to provide baseline/control data which can be utilized by the breakaway alert generator 1408 to determine whether a breakaway event has occurred. In some examples in which the additional sensor(s) 906 are not utilized, block 1806 may be omitted.

At block 1808, the example controller 114 determines whether a door curtain breakaway event has been detected. In some examples, the breakaway alert generator 1408 determines whether the door curtain 104 has transitioned to the breakaway state based on characteristics of data analyzed by the sensor data analyzer 1402. Specifically, if the sensor data analyzer 1402 and/or the breakaway alert generator 1408 determines that characteristics of the sensor data from the sensor 904 correspond to a refeed operation, then a door curtain breakaway event can be determined to have occurred (as a breakaway must have preceded a refeed operation). In some examples, the sensor data analyzer 1402 and/or the breakaway alert generator 1408 can compare data from the sensor 904 with a data from the additional sensor(s) 906 on another part of the door 102, as analyzed at block 1806 to determine whether a force and/or motion characteristic of the sensor 904 is unique to the refeed block 124*a*, and thus may potentially indicate a refeed operation. In some examples, the sensor data analyzer 1402 and/or the breakaway alert generator 1408 compares characteristics of the sensor data with known characteristics (e.g., observed in training data, programmed into the sensor data analyzer 1402, etc.) of refeed operations. In response to determining that a door curtain breakaway event has been detected, processing transfers to block 1810. Conversely, in response to determining that a door curtain breakaway event has not been detected, processing transfers to block 1812.

At block 1810, the example controller 114 generates a breakaway detection alert. In some examples, the breakaway alert generator 1408 generates a breakaway detection alert.

At block 1812, the example controller 114 determines whether to continue monitoring. In response to continuing monitoring, processing transfers to block 1802. Conversely, in response to not continuing monitoring, processing terminates.

Figure 19:
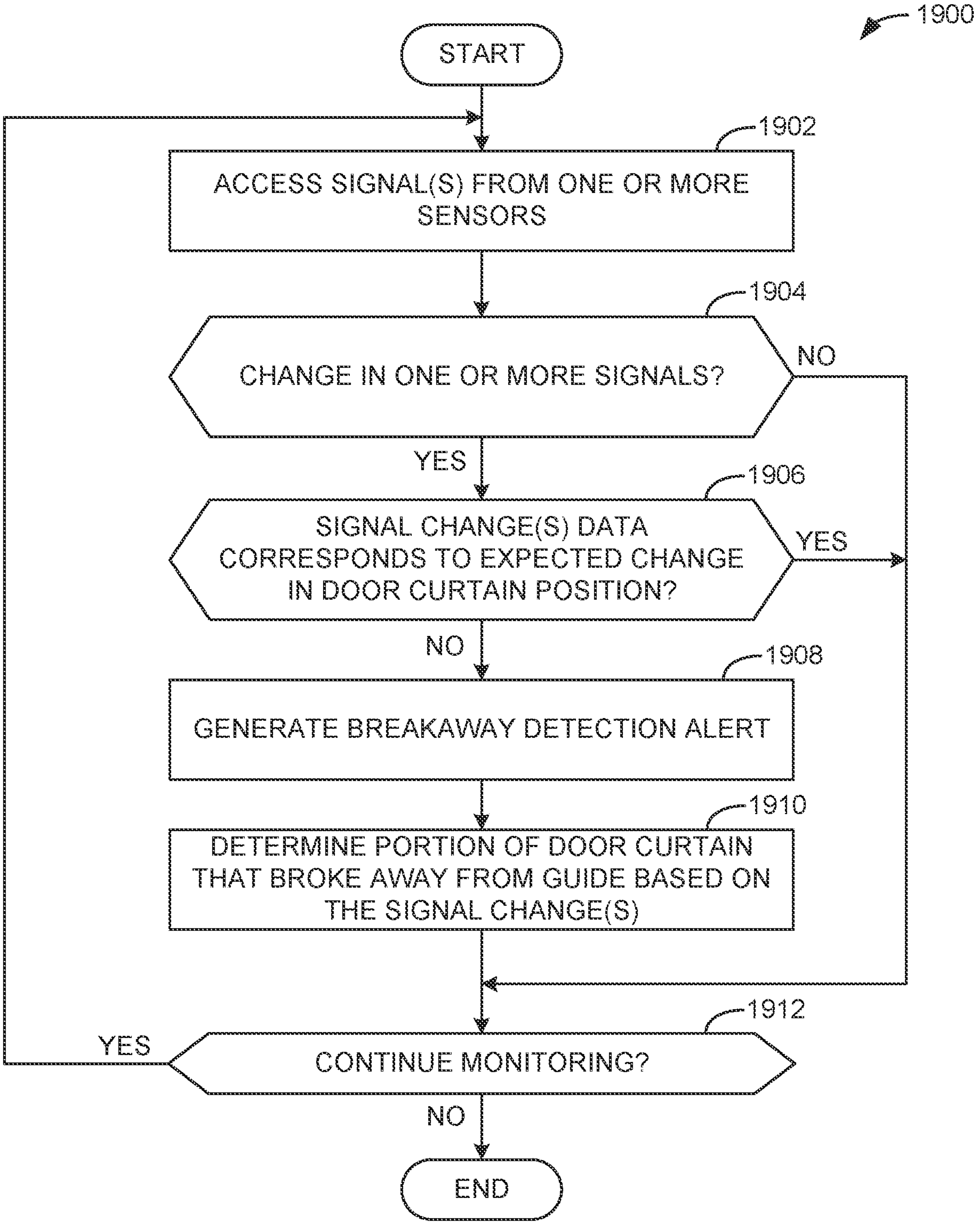
FIG. 19 is a flowchart representative of example machine readable instructions that may be executed to implement the example controller of FIG. 14 to detect a door curtain breakaway event using the fifth door curtain breakaway detection system of FIG. 10A.

Example machine readable instructions 1900 that may be executed by the controller 114 to detect a door curtain breakaway event using any one of the door curtain breakaway detection systems of FIGS. 10A-C, 11A-C, and/or 12 are illustrated in FIG. 19. With reference to the preceding figures and associated description, the example machine readable instructions 1900 of FIG. 19 begin with the example controller 114 accessing signal(s) from one or more sensors (block 1902). In some examples, the sensor data analyzer 1402 accesses signal(s) from one or more of the sensors 1004 of FIG. 10A, the sensors 1104 of FIGS. 11A-C, and/or the photoelectric sensor 1204 of FIG. 12.

At block 1904, the example controller 114 determines whether there has been a change in one or more of the signals. In some examples, the sensor data analyzer 1402 determines whether there has been a change in one or more of the signals from the sensors 1004. In response to there being a change in one or more of the signals, processing transfers to block 1906. Conversely, in response to there not being a change in one or more of the signals, processing transfers to block 1912.

At block 1906, the example controller 114 determines whether the signal change(s) correspond to an expected change in door curtain position. In some examples, the breakaway alert generator 1408 determines whether the signal change(s) correspond to an expected change in a position of the door curtain 104 based on data from the door position monitor 1404. As a first example, the sensor data analyzer 1402 can determine, based on a signal from a particular one of the sensors 1004, 1104, 1204, that the door curtain 104 is no longer detected adjacent the one of the sensors 1004 (e.g., based on not detecting one of the alignment features 118 for a duration of time while the door is in motion adjacent the sensor 1004), the sensors 1104 (e.g., based on not detecting one of the metal features 1106 for a duration of time while the door is in motion adjacent the sensor 1104, and/or the sensor 1204 (e.g., based on the beam of light 1210 passing across the path of the door curtain 104 between the first and second portions 1206, 1208 of the sensor 1204). If, based on door curtain position data and knowledge of the speed of the door curtain 104, the sensor 1004, 1104, 1204 would have been expected to see a signal change, and this did not occur, the breakaway alert generator 1408 can determine that the signal change data does not correspond to an expected change in door curtain position.

As a second example, if the door curtain 104 is known to be above the sensor 1004, 1104, 1204, and the door curtain 104 is continuing to move upward, there would be no expected change in the position of the door curtain 104 (and thus no anticipated signal change, at least until the direction of movement of the door curtain 104 changes to move toward and then passed the sensor 1004, 1104, 1204). In a third example, specific to FIG. 10A for purposes of explanation, a bottom edge of the door curtain 104 is four feet below the sensor 1004, the speed of the door curtain 104 is known to be one foot/per second, the door is known to be moving upward, and the alignment features are evenly distributed every six inches vertically. If, in this third example, no signal changes associated with detection of alignment features are detected for two seconds (e.g., during which time, four alignment features should have been detected), the breakaway alert generator 1408 can determine that a breakaway event has occurred.

In response to the signal change(s) corresponding to an expected change in door curtain position, processing transfers to block 1912. Conversely, in response to the signal change(s) not corresponding to an expected change in the door curtain position, processing transfers to block 1908.

At block 1908, the example controller 114 generates a breakaway detection alert. In some examples, the breakaway alert generator 1408 generates a breakaway detection alert.

At block 1910, the example controller 114 determines a portion of the door curtain 104 that broke away from the guide 110 based on the signal change(s). In some examples, the breakaway alert generator 1408 determines a portion of the door curtain 104 that broke away from the guide 110 based on the changes in the signal(s) from the sensor data analyzer 1402 and the door position from the door position monitor 1404. For example, based on the door position and the location of the sensor at which the door curtain 104 was detected to be in the breakaway state, the portion of the door curtain 104 between the sensor and a bottom edge of the door curtain 104 can be determined to be in the breakaway state.

At block 1912, the example controller 114 determines whether to continue monitoring. In response to continuing monitoring, processing transfers to block 1902. Conversely, in response to not continuing monitoring, processing terminates.

Figure 20:
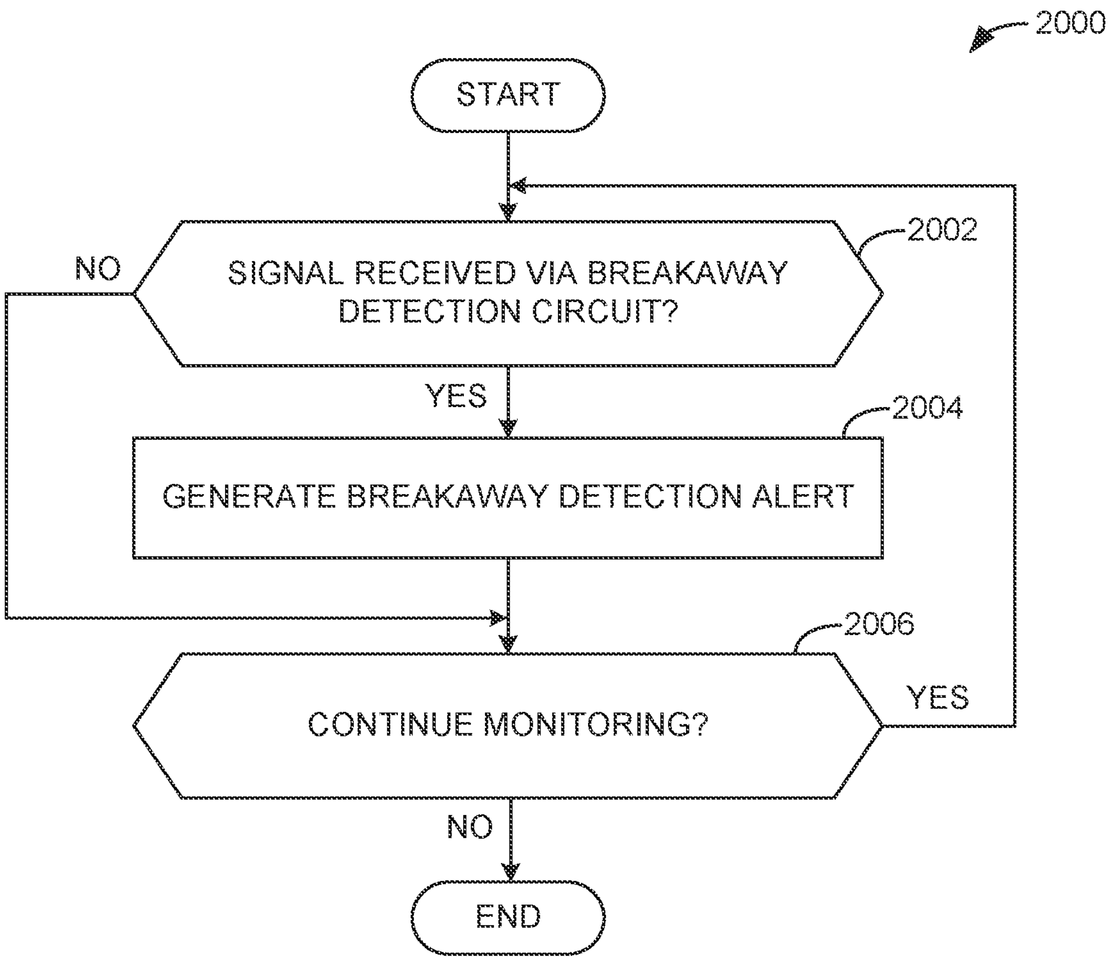
FIG. 20 is a flowchart representative of example machine readable instructions that may be executed to implement the example controller of FIG. 14 to detect a door curtain breakaway event using the eighth door curtain breakaway detection system of FIG. 13.

Example machine readable instructions 2000 that may be executed by the controller 114 to detect a door curtain breakaway event using the eighth door curtain breakaway detection system of FIG. 13 are illustrated in FIG. 20. With reference to the preceding figures and associated description, the example machine readable instructions 2000 of FIG. 20 begin with the example controller 114 determining whether a signal has been received via a breakaway detection circuit (block 2002). In some examples, the sensor data analyzer 1402 determines whether a signal has been received via the electrical circuit 1306, indicating that a refeed operation has occurred in which a conductive one of the alignment features 118 closed the electrical circuit 1306 by electrically connecting a pair of the refeed rollers 122. In response to a signal having been received via the breakaway detection circuit, processing transfers to block 2004. Conversely, in response to the signal not being received via the breakaway detection circuit, processing transfers to block 2006.

At block 2004, the example controller 114 generates a breakaway detection alert. In some examples, the breakaway alert generator 1408 generates a breakaway detection alert.

At block 2006, the example controller 114 determines whether to continue monitoring. In response to continuing monitoring, processing transfers to block 2002. Conversely, in response to not continuing monitoring, processing terminates.

Figure 21:
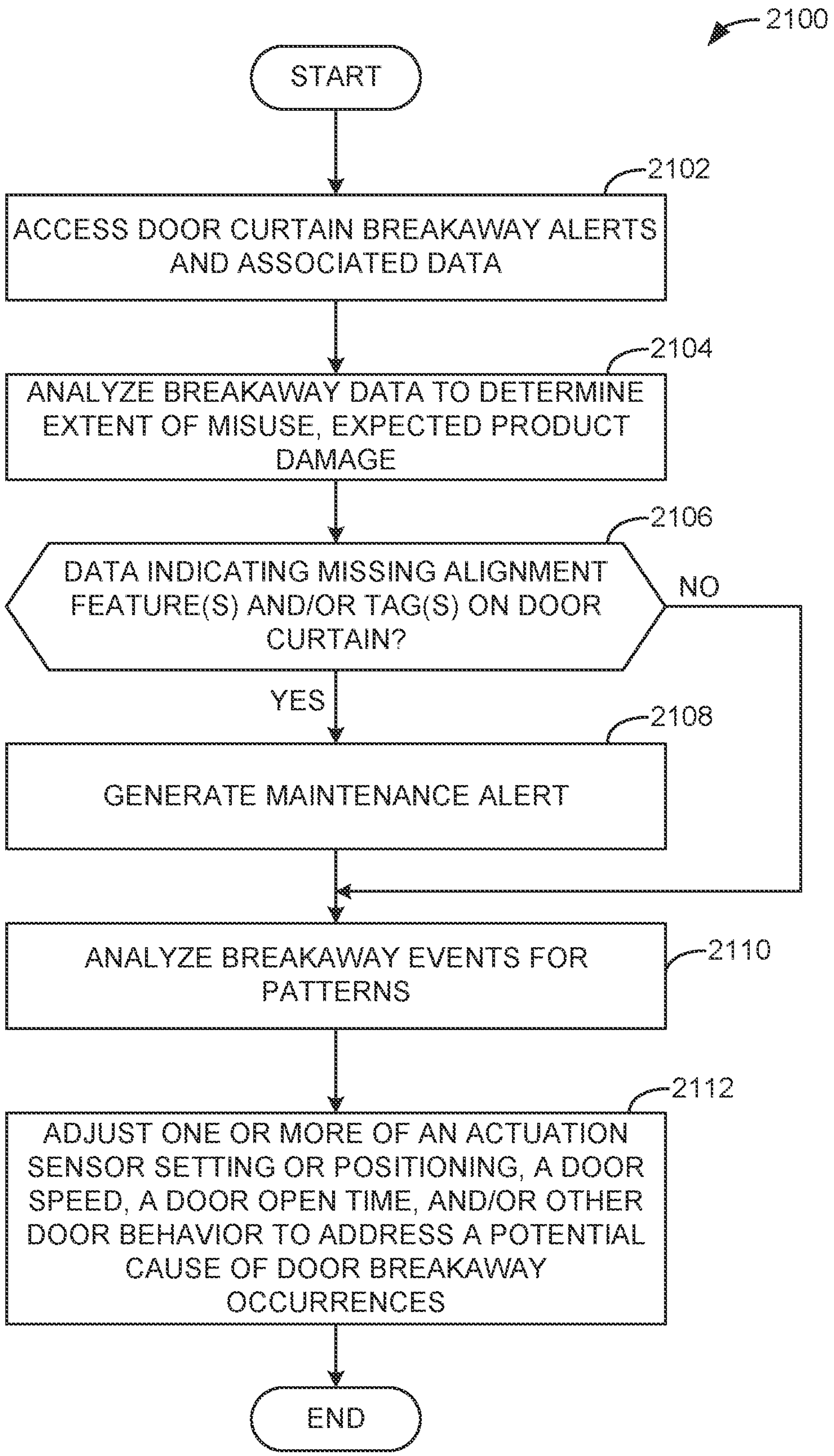
FIG. 21 is a flowchart representative of example machine readable instructions that may be executed to implement the example controller of FIG. 14 to analyze breakaway event data and cause adjustments based on the analysis of breakaway event data.

Example machine readable instructions 2100 that may be executed by the controller 114 to analyze breakaway event data and cause adjustments based on the analysis of the breakaway event data are illustrated in FIG. 21. With reference to the preceding figures and associated description, the example machine readable instructions 2100 of FIG. 21 begin with the example controller 114 accessing door curtain breakaway event alerts and associated data (block 2102). In some examples, the breakaway alert analyzer 1410 accesses door curtain breakaway event alerts from the breakaway alert generator 1408 and associated data from the sensor data analyzer 1402.

At block 2104, the example controller 114 analyzes breakaway event data to determine an extent of expected product damage. In some examples, the report generator 1412 analyzes the breakaway event data to determine an extent of expected product damage. In some examples, the report generator 1412 analyzes patterns of breakaway occurrences to attempt to identify a cause of the door curtain 104 transitioning to the breakaway state. In some examples, the report generator 1412 estimates an amount of damage to components of the door 102, based on a number of breakaway events, and/or data associated with the breakaway events (e.g., a location of the breakaway along the door curtain 104). For example, the report generator 1412 may generate a report indicating that 50% of the door curtain breakaway events were initiated in the upper half of the door curtain 104, indicating that these were not "near misses" wherein the vehicle and/or person only contacted a bottom edge of the door curtain 104 as the door curtain 104 was moving to the open position. In some examples, the report generator 1412 is integrated with the maintenance alert generator 1406 and/or works in tandem with the maintenance alert generator 1406 to generate reports indicating a quantification and/or description of damage incurred by components of the door curtain 104. For example, the report generator 1412 and/or the maintenance alert generator 1406 can report on an amount of wear to the door curtain 104, an amount of wear to the alignment features 118 due to excessive refeed operations, etc.

At block 2106, the example controller 114 determines whether there is data indicating a missing alignment feature and/or missing tag(s) on the door curtain. In some examples, the maintenance alert generator 1406 determines whether there is data that has been received by the sensor data analyzer 1402 indicating one of the alignment features 118 may be missing, or one of the tags 604 may be missing or malfunctioning. For example, the maintenance alert generator 1406 can determine that there is data indicating missing and/or malfunctioning ones of the tags 604 if (1) the door position monitor 1404 determines the door curtain 104 moved past one of the scanners 606 for a distance and/or duration that should have enabled the scanner 606 to detect one or more of the tags 604 and (2) the breakaway alert generator 1408 and/or the sensor data analyzer 1402 determined the door curtain 104 did not transition to the breakaway state. In response to data indicating missing alignment feature(s) and/or tag(s) on the door curtain, processing transfers to block 2108. Conversely, in response to no data indicating missing alignment features and/or tag(s) on the door curtain, processing transfers to block 2110.

At block 2108, the example controller 114 generates a maintenance alert. In some examples, the maintenance alert generator 1406 generates a maintenance alert. For example, the maintenance alert generator 1406 can communicate an alert to a maintenance facility, a maintenance operator and/or other entity, to enable subsequent correction of the potential maintenance problem (e.g., a missing alignment feature, a malfunctioning tag, etc.).

At block 2110, the example controller 114 analyzes breakaway events for patterns. In some examples, the report generator 1412 analyzes breakaway events for patterns. For example, the report generator 1412 can attempt to identify patterns pertaining to where persons and/or vehicles are initiating the transition of the door curtain 104 to the breakaway state, patterns pertaining to where persons and/or vehicles are approaching the door, patterns pertaining to the time of day breakaway events occurring, etc.

At block 2112, the example controller 114 adjusts one or more of an actuation sensor setting or positioning, a door speed, a door open time, and/or other door behavior to address a potential cause of door breakaway occurrences. In some examples, the door actuation adjustor 1414 adjusts a parameter associated with a sensor that causes the door curtain 104 to actuate to the open position. For example, the door actuation adjustor 1414 can adjust a delay between a time that motion is detected and a time when the door curtain 104 begins to open. In some examples, the door actuation adjustor 1414 adjusts a position of the one or more sensors that cause the door curtain 104 to actuate to the open position. In some examples, the door motion adjustor 1416 adjusts a speed of the door curtain 104. In some examples, the door motion adjustor 1416 adjusts an amount of time the door curtain 104 remains open. The door actuation adjustor 1414 and/or the door motion adjustor 1416 can issue control signals to make adjustments based on recommendations generated by the report generator 1412 and/or based on alerts generated by the maintenance alert generator 1406 or the breakaway alert generator 1408.

Figure 22:
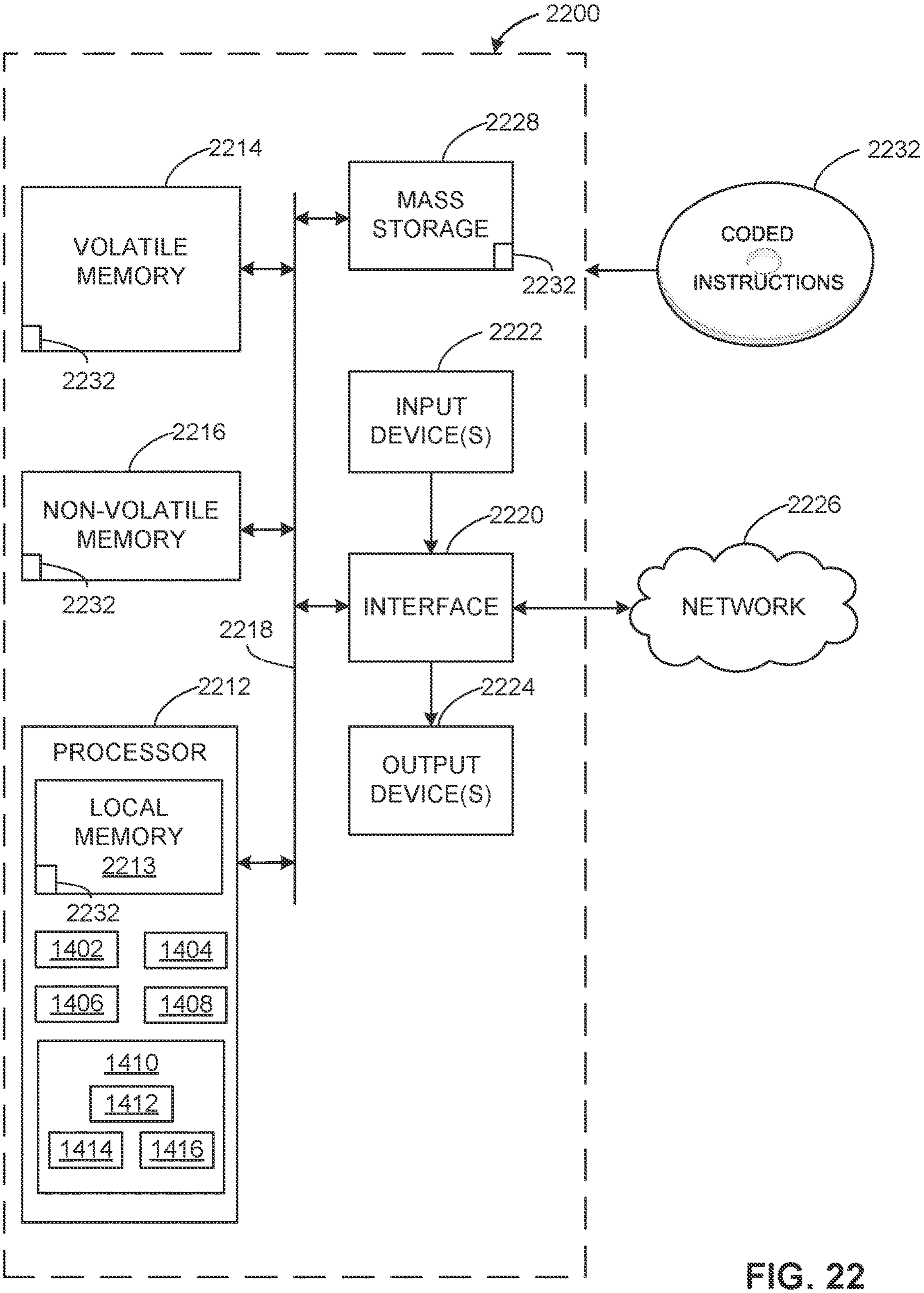
FIG. 22 is a block diagram of an example processor platform structured to execute the example machine readable instructions of FIGS. 15-21 to implement the example controller of FIG. 14.

FIG. 22 is a block diagram of an example processor platform 2200 structured to execute the instructions of FIGS. 15-21 to implement the controller 114 of FIG. 14. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor data analyzer 1402, the example door position monitor 1404, the example maintenance alert generator 1406, the example breakaway alert generator 1408, the example breakaway alert analyzer 1410, the example report generator 1412, the example door actuation adjustor 1414, and the example door motion adjustor 1416.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), a Bluetooth® interface, a near field communication (NFC) interface, and/or a PCI express interface.

In the illustrated example, one or more input devices 2222 are connected to the interface circuit 2220. The input device(s) 2222 permit(s) a user to enter data and/or commands into the processor 2212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2220 of the illustrated example, thus, typically includes a graphics driver card, a graphics driver chip and/or a graphics driver processor.

The interface circuit 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, redundant array of independent disks (RAID) systems, and digital versatile disk (DVD) drives.

The machine executable instructions 2232 of FIGS. 15-21 may be stored in the mass storage device 2228, in the volatile memory 2214, in the non-volatile memory 2216, and/or on a removable non-transitory computer readable storage medium such as a CD or DVD.

From the foregoing, it will be appreciated that example methods, apparatus and articles of manufacture have been disclosed that enable detection of door curtain breakaway events and subsequent analysis and adjustments to attempt to address the cause of detected door curtain breakaway events. Examples disclosed herein reduce damage to breakaway doors by accurately identifying when door curtain breakaway events occur, and by providing additional data such as locations (e.g., vertical locations along a door curtain) at which the door curtain breakaway event occurred. In analyzing door curtain breakaway events, example techniques disclosed herein identify patterns in the breakaway events and cause adjustments of components associated with breakaway doors to address causes of the breakaway events. Further, example techniques disclosed herein include the detection of potential maintenance problems with a breakaway door and the accurate generation of maintenance alerts.

Example 1 includes an apparatus comprising a sensor to detect a lateral edge of a door curtain within a guide of a door, and a controller to identify when the door curtain transitions from an operational state to a breakaway state based on a signal from the sensor, the operational state corresponding to when the lateral edge of the door curtain is enclosed by the guide as the door curtain moves between open and closed positions, the breakaway state corresponding to when a portion of the lateral edge of the door curtain below an upper end of the guide breaks away from the guide.

Example 2 includes the apparatus of example 1, and further includes a refeed assembly to refeed the lateral edge of the door curtain into the guide in response to the door curtain transitioning to the breakaway state, the sensor being below the refeed assembly.

Example 3 includes the apparatus of any one of examples 1 or 2, wherein the sensor is a scanner disposed on the guide, the scanner to detect a tag affixed to the lateral edge of the door curtain, the tag to move within the guide when the door curtain moves in the operational state.

Example 4 includes the apparatus of example 3, wherein the controller is to determine the door curtain is in the breakaway state based on (1) whether the scanner detects the tag and (2) a vertical position of the door curtain.

Example 5 includes the apparatus of example 4, wherein the controller is to determine the door curtain is in the breakaway state when (1) the vertical position of the door curtain corresponds to a bottom edge of the door curtain being below a height of the scanner and (2) the scanner does not detect at least one of a plurality of tags, the plurality of tags including the tag.

Example 6 includes the apparatus of example 5, wherein the controller is to determine a distance between the tag and the bottom edge of the door curtain based on serial data associated with the tag.

Example 7 includes the apparatus of any one of examples 3-6, wherein the tag is an RFID tag.

Example 8 includes the apparatus of any one of examples 3-7, wherein the scanner is vertically positioned in a lower half of the guide.

Example 9 includes the apparatus of any one of examples 1 or 2, wherein the sensor is a switch, the switch to communicate a first signal when the door curtain is present adjacent the switch and a second signal when the door curtain is not present adjacent the switch.

Example 10 includes the apparatus of example 9, wherein the sensor is at least partially embedded in a seal portion of the guide.

Example 11 includes the apparatus of example 10, wherein the switch is spring-loaded, the switch to retract when the door curtain is present adjacent the switch.

Example 12 includes the apparatus of any one of examples 10 or 11, wherein the seal portion is to reduce airflow through a doorway associated with the door.

Example 13 includes the apparatus of any one of examples 1 or 2, wherein the sensor is to be mounted on the guide, the sensor oriented toward the lateral edge of the door curtain.

Example 14 includes the apparatus of example 13, wherein the sensor is mounted in a hole in the guide.

Example 15 includes the apparatus of 13 or 14, wherein the door curtain includes a plurality of alignment features, the sensor to detect the alignment features.

Example 16 includes the apparatus of any one of examples 13-15, wherein the sensor is a capacitive proximity sensor or an ultrasonic proximity sensor.

Example 17 includes the apparatus of example 15, wherein one of the plurality of alignment features includes a metallic portion.

Example 18 includes the apparatus of example 17, wherein the sensor is an inductive proximity sensor.

Example 19 includes the apparatus of example 15, wherein one of the plurality of alignment features includes a magnet, and the sensor is a hall sensor.

Example 20 includes the apparatus of any one of examples 15-19, wherein the controller is to identify a missing alignment feature based on data from the sensor.

Example 21 includes the apparatus of any one of examples 13-15, wherein the sensor is a magnetometer, the magnetometer to detect a presence of a vehicle passing through the door.

Example 22 includes the apparatus of example 13, wherein an outermost edge of the lateral edge of the door curtain includes a metal feature, the sensor to detect the metal feature.

Example 23 includes the apparatus of example 22, wherein the sensor is urged toward the outermost edge by a biasing element to place a sensor assembly in contact with the outermost edge, the sensor assembly including the sensor.

Example 24 includes the apparatus of example 23, wherein the sensor assembly includes a roller to interface with the outermost edge.

Example 25 includes the apparatus of any one of examples 1 or 2, wherein the sensor is a photoelectric sensor, the photoelectric sensor to detect a beam of light transmitted across of a path of door curtain when the door curtain is in the breakaway state, the door curtain to block to the beam of light when the door curtain is in the operational state.

Example 26 includes the apparatus of example 25, wherein the photoelectric sensor is a retro-reflective photo-eye.

Example 27 includes the apparatus of any one of examples 1-26, wherein the sensor is one of a plurality of sensors distributed along the guide.

Example 28 includes the apparatus of any one of examples 1-27, wherein the controller includes a door motion adjustor to cause the door curtain to move to a fully open position in response to the door curtain transitioning from the operational state to the breakaway state.

Example 29 includes the apparatus of example 28, wherein the door motion adjustor is to cause the door curtain to move to the fully open position in response to (1) the door curtain transitioning from the operational state to the breakaway state and (2) the door curtain being configured for partially-open operation.

Example 30 includes the apparatus of any one of examples 1-24, or 27-29, wherein the door curtain includes a reflective surface and the sensor is a photoelectric sensor, the photoelectric sensor to detect a beam of light reflected off the reflective surface when door curtain is in the operational state, the sensor not to detect the beam of light when the door curtain is in the breakaway state.

Example 31 includes an apparatus comprising, a refeed roller assembly including an electronic component to detect a refeed operation, the refeed operation to transition a door curtain from a breakaway state to an operational state, at least a portion of a lateral edge of the door curtain to be displaced out of a guide for the door curtain when the door curtain is in the breakaway state, the lateral edge of the door to be guided within the guide when the door curtain is in the operational state, and a controller to identify when the door curtain transitions from an operational state to a breakaway state based on a signal from the electronic component.

Example 32 includes the apparatus of example 31, wherein the electronic component includes a switch, the switch to be actuated based on lateral movement of a refeed roller associated with the refeed roller assembly.

Example 33 includes the apparatus of example 32, further including a spring to bias the refeed roller toward the switch.

Example 34 includes the apparatus of example 31, wherein the electronic component is a sensor mounted to the refeed roller assembly to detect motion indicative of the refeed operation.

Example 35 includes the apparatus of example 34, wherein the sensor is an accelerometer.

Example 36 includes the apparatus of example 35, wherein the sensor is a first sensor, the apparatus further including a second sensor mounted at a location separate from the refeed roller assembly to provide baseline sensor data, the controller to identify when the door curtain has transitioned from the operational state to the breakaway state based on a comparison of the baselines sensor data to data provided by the first sensor.

Example 37 includes the apparatus of example 34, wherein the sensor is embedded within the refeed roller assembly.

Example 38 includes the apparatus of any one of examples 31-37, wherein the refeed roller assembly includes a pair of refeed rollers, a first refeed roller of the pair to be disposed on a first side of the door curtain, a second refeed roller of the pair to be disposed on a second side of the door curtain, the door curtain including a conductive feature, the conductive feature to contact the pair of refeed rollers during the refeed operation, wherein the electronic component is an electronic circuit to connect an input power source and the controller through the pair of refeed rollers and the electronic circuit during the refeed operation.

Example 39 includes the apparatus of example 38, wherein the controller is to identify when the door curtain has transitioned from the operational state to the breakaway state in response to a signal received from the electronic circuit.

Example 40 includes the apparatus of any one of examples 38 or 39, wherein the pair of refeed rollers are to cause the conductive feature to move into alignment with the guide during the refeed operation.

Example 41 includes an apparatus comprising a breakaway alert generator to generate an output including an indication of whether a door curtain moved between a breakaway state and an operational state, a lateral edge of the door curtain being in alignment with a guide when the door curtain is in the operational state, at least a portion of the lateral edge being out of alignment with the guide when the door curtain is in the breakaway state, and a breakaway alert analyzer to determine a portion of the door curtain which broke away from the guide causing the door curtain to transition to the breakaway state from the operational state.

Example 42 includes the apparatus of example 41, wherein the breakaway alert analyzer is to cause an adjustment to a characteristic of a door system associated with the door curtain.

Example 43 includes the apparatus of example 42, wherein the characteristic corresponds to at least one of (1) a positioning of a door actuation sensor, (2) a timing of door actuation, or (3) an amount of time the door curtain remains open after moving to an open position.

Example 44 includes the apparatus of any one of examples 42 or 43, further including, a sensor data analyzer to determine at least one of a presence of the door curtain in the guide or an occurrence of a refeed operation, and a door position monitor to determine a vertical position of the door curtain, the breakaway alert generator to generate the output based on (1) the at least one of the presence of the door curtain in the guide or the occurrence of the refeed operation and (2) the vertical position of the door curtain.

Example 45 includes the apparatus of example 44, wherein the sensor data analyzer is to determine whether one of a plurality of alignment features is missing from the door curtain based on sensor data, the alignment features affixed to the lateral edge of the door curtain to retain the lateral edge of the door curtain within the guide.

Example 46 includes the apparatus of example 45, further including a maintenance alert generator to generate a maintenance alert in response to the sensor data analyzer determining one of the plurality of alignment features is missing.

Example 47 includes the apparatus of any one of examples 41-46, wherein the breakaway alert analyzer is to generate a report including at least one of (1) a prevalence of the door curtain transitioning to the breakaway state from the operational state, (2) an expected damage to a component of the door system based on the door transitioning to the breakaway state from the operational state, or (3) a recommended adjustment to reduce a likelihood of the door curtain transitioning to the breakaway state from the operational state.

Example 48 includes the apparatus of any one of examples 41-47, further including a door motion adjustor to cause the door curtain to move to a fully open position in response to (1) the door curtain transitioning from the operational state to the breakaway state and (2) the door curtain being configured for partially-open operation.

Example 49 includes a method comprising generating an output including an indication of whether a door curtain moved between a breakaway state and an operational state, a lateral edge of the door curtain being in alignment with a guide when the door curtain is in the operational state, at least a portion of the lateral edge being out of alignment with the guide when the door curtain is in the breakaway state, and determining a portion of the door curtain which broke away from the guide causing the door curtain to transition to the breakaway state from the operational state.

Example 50 includes the method of example 49, further including causing an adjustment to a characteristic of a door system associated with the door curtain.

Example 51 includes the method of example 50, wherein the characteristic corresponds to at least one of (1) a positioning of a door actuation sensor, (2) a timing of door actuation, or (3) an amount of time the door curtain remains open after moving to an open position.

Example 52 includes the method of any one of examples 50 or 51, further including determining at least one of a presence of the door curtain in the guide or an occurrence of a refeed operation, and determining a vertical position of the door curtain, the generating the output based on (1) the at least one of the presence of the door curtain in the guide or the occurrence of the refeed operation and (2) the vertical position of the door curtain.

Example 53 includes the method of any one of examples 50-52, further including generating a report including at least one of (1) a prevalence of the door curtain transitioning to the breakaway state from the operational state, (2) an expected damage to a component of the door system based on the door transitioning to the breakaway state from the operational state, or (3) a recommended adjustment to reduce a likelihood of the door curtain transitioning to the breakaway state from the operational state.

Example 54 includes the method of any one of examples 50-53, further including determining whether one of a plurality of alignment features or a tag is missing from the door curtain based on sensor data, the plurality of alignment features affixed to the lateral edge of the door curtain to retain the lateral edge of the door curtain within the guide.

Example 55 includes the method of example 54, further including generating a maintenance alert in response to determining one of the plurality of alignment features is missing.

Example 56 includes a non-transitory computer readable medium comprising machine readable instructions which, when executed, cause a processor to generate, by executing an instruction with the processor, an output including an indication of whether a door curtain moved between a breakaway state and an operational state, a lateral edge of the door curtain being in alignment with a guide when the door curtain is in the operational state, at least a portion of the lateral edge being out of alignment with the guide when the door curtain is in the breakaway state, and determine a portion of the door curtain which broke away from the guide causing the door curtain to transition to the breakaway state from the operational state.

Example 57 includes the computer readable medium of example 56, wherein the instructions, when executed, further cause the processor to cause an adjustment to a characteristic of a door system associated with the door curtain.

Example 58 includes the computer readable medium of example 57, wherein the characteristic corresponds to at least one of (1) a positioning of a door actuation sensor, (2) a timing of door actuation, or (3) an amount of time the door curtain remains open after moving to an open position.

Example 59 includes the computer readable medium of any one of examples 57 or 58, wherein the machine readable instructions, when executed, cause the processor to determine, by executing an instruction with the processor, at least one of a presence of the door curtain in the guide or an occurrence of a refeed operation, and determine, by executing an instruction with the processor, a vertical position of the door curtain, wherein generating the output based on (1) the at least one of the presence of the door curtain in the guide or the occurrence of the refeed operation and (2) the vertical position of the door curtain.

Example 60 includes the computer readable medium of any one of examples 57-59, wherein the machine readable instructions, when executed, cause the processor to generate a report including at least one of (1) a prevalence of the door curtain transitioning to the breakaway state from the operational state, (2) an expected damage to a component of the door system based on the door transitioning to the breakaway state from the operational state, or (3) a recommended adjustment to reduce a likelihood of the door curtain transitioning to the breakaway state from the operational state.

Example 61 includes the computer readable medium of any one of examples 57-60, wherein the machine readable instructions, when executed, cause the processor to determine whether one of a plurality of alignment features is missing from the door curtain based on sensor data, the plurality of alignment features affixed to the lateral edge of the door curtain to retain the lateral edge of the door curtain within the guide.

Example 62 includes the computer readable medium of example 61, wherein the machine readable instructions, when executed, cause the processor to generate a maintenance alert in response to determining one of the plurality of alignment features is missing.

Example 63 includes an apparatus comprising a breakaway alert generator to determine a door curtain moved from an operational state to a breakaway state, a lateral edge of the door curtain being in alignment with a guide when the door curtain is in the operational state, at least a portion of the lateral edge being out of alignment with the guide when the door curtain is in the breakaway state, and a door motion adjustor to cause the door curtain to move to a fully open position to restore the door curtain to the operational state in response to the door curtain transitioning from the operational state to the breakaway state.

Example 64 includes the apparatus of example 63, wherein the door motion adjustor is to cause the door curtain to move to the fully open position in response to (1) the door curtain transitioning from the operational state to the breakaway state and (2) the door curtain being configured to actuate between a closed position and a partially-open position when the door curtain is in the operational state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:

a plurality of tags distributed along a lateral edge of a door curtain, the tags to travel along a channel within a guide of a door as the door curtain moves along the guide;

a scanner disposed on the guide, the scanner to detect ones of the tags as the tags pass the scanner during an operational state of the door curtain; and a controller to identify when the door curtain transitions from the operational state to a breakaway state based on a signal from the scanner, the operational state corresponding to when the lateral edge of the door curtain is enclosed by the guide as the door curtain moves between open and closed positions, the breakaway state corresponding to when a portion of the lateral edge of the door curtain below an upper end of the guide breaks away from the guide, the portion of the lateral edge including at least one of the tags.

2. The apparatus of claim 1, further including a refeed assembly to refeed the lateral edge of the door curtain into the guide in response to the door curtain transitioning to the breakaway state, the scanner being below the refeed assembly.

3. The apparatus of claim 1, wherein the first tag is an RFID tag.

4. The apparatus of claim 1, wherein the scanner is vertically positioned in a lower half of the guide.

5. The apparatus of claim 1, wherein the scanner is a first scanner, the apparatus further including a second scanner disposed on the guide, the second scanner spaced apart from the first scanner.

6. The apparatus of claim 1, wherein the controller is to determine the door curtain is in the breakaway state based on (1) whether the scanner detects a first tag of the plurality of tags and (2) a vertical position of the door curtain.

7. The apparatus of claim 6, wherein the controller is to determine the door curtain is in the breakaway state when (1) the vertical position of the door curtain corresponds to a bottom edge of the door curtain being below a height of the scanner and (2) the scanner does not detect at least one of the plurality of tags.

8. The apparatus of claim 7, wherein the controller is to determine a distance between the first tag and the bottom edge of the door curtain based on serial data associated with the first tag.

9. The apparatus of claim 1, further including a plurality of alignment features distributed along the lateral edge of the door curtain, the plurality of alignment features to protrude away from the door curtain to help retain the lateral edge within the guide.

10. The apparatus of claim 9, wherein ones of the alignment features include ones of the tags.

11. The apparatus of claim 9, wherein ones of the tags are positioned between ones of the alignment features.

12. The apparatus of claim 11, wherein the tags and the alignment features are distributed along the lateral edge in an alternating pattern.

13. An apparatus comprising:
- a door curtain;
- a track to guide movement of the door curtain between an open position and a closed position relative to a doorway;
- a plurality of tags distributed along the door curtain, the tags to move with the door curtain;
- a scanner disposed on the track, the scanner to detect a series of the tags as successive ones of the tags in the series pass the scanner as the door curtain moves between the open position and the closed position; and
- a controller to identify when the door curtain is in a breakaway state based on a failure of the scanner to detect given ones of the tags in the series when the given ones of the tags are expected to pass the scanner based on a position and movement of the door curtain.

14. The apparatus of claim 13, wherein the plurality of tags are RFID tags.

15. The apparatus of claim 13, wherein the plurality of tags are Bluetooth low energy tags.

16. The apparatus of claim 13, wherein the scanner is positioned to detect ones of the tags when the tags travel within a channel of the track, the scanner to fail to detect the tags when the tags are outside of the channel due to the door curtain being in the breakaway state.

17. The apparatus of claim 13, wherein the plurality of tags are serialized to enable at least one of the scanner or the controller to decode location information included in the tags, the location information to indicate a vertical position of respective ones of the tags.

18. The apparatus of claim 13, wherein the controller is to determine the scanner failed to detect the given ones of the tags based on a threshold time period elapsing without detecting a threshold number of the tags, the threshold number of the tags based on the spacing of the tags and a speed of movement of the door curtain.

19. The apparatus of claim 13, wherein the controller is to generate an alert in response to the scanner detecting first and second tags within the series of the tags without detecting a third tag, the third tag located between the first and second tags, the alert indicative of at least one of a missing tag or a non-operational tag.

20. An apparatus comprising:
- a door curtain to move along a guide positioned adjacent a doorway;
- RFID tags distributed along a lateral edge of the door curtain;
- an RFID scanner to detect ones of the RFID tags when the ones of the RFID tags are in proximity to the RFID scanner, different ones of the RFID tags to be in proximity to the RFID scanner at different times associated with different heights of a leading edge of the door curtain; and
- a controller to:
  - control movement of the door curtain;
  - monitor a position of the leading edge of the door curtain;
  - determine a position of a first tag of the RFID tags based on the position of the leading edge of the door curtain; and
  - determine the door curtain is in a breakaway state when the position of the first tag passes the RFID scanner and the RFID scanner does not detect the first tag.

* * * * *